(12) United States Patent
Moteki et al.

(10) Patent No.: US 10,996,062 B2
(45) Date of Patent: May 4, 2021

(54) INFORMATION PROCESSING DEVICE, DATA MANAGEMENT DEVICE, DATA MANAGEMENT SYSTEM, METHOD, AND PROGRAM

(71) Applicant: FUJITSU LIMITED, Kawasaki (JP)

(72) Inventors: Atsunori Moteki, Chofu (JP); Taichi Murase, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 49 days.

(21) Appl. No.: 16/402,650

(22) Filed: May 3, 2019

(65) Prior Publication Data
US 2019/0257659 A1    Aug. 22, 2019

Related U.S. Application Data

(63) Continuation of application No. PCT/JP2018/000833, filed on Jan. 15, 2018.

(30) Foreign Application Priority Data

Jan. 31, 2017 (JP) .............................. JP2017-016252

(51) Int. Cl.
*G01C 21/32* (2006.01)
*G06T 7/73* (2017.01)
(Continued)

(52) U.S. Cl.
CPC ............ *G01C 21/32* (2013.01); *G01C 21/28* (2013.01); *G06T 1/00* (2013.01); *G06T 7/73* (2017.01);
(Continued)

(58) Field of Classification Search
CPC .......... G01C 21/32; G01C 21/28; G06T 7/73; G06T 1/00; G06T 2207/30264; G08G 1/14; G09B 29/00; G09B 29/10
(Continued)

(56) References Cited

U.S. PATENT DOCUMENTS 9,612,123 B1* 4/2017 Levinson ................. G01S 17/87
2008/0101656 A1* 5/2008 Barnes ............... G06K 9/00771
                                                                            382/104
(Continued)

FOREIGN PATENT DOCUMENTS

JP    2005-173748    6/2005
JP    2007-303842    11/2007
(Continued)

OTHER PUBLICATIONS

Raul Mur-Artal, J.M.M. Montiel, Member, IEEE, and Juan D. Tardos, Member, IEEE, "ORB-SLAM: A Versatile and Accurate Monocular SLAM System", IEEE Transactions on Robotics, vol. 31, No. 5, Oct. 2015, pp. 1147-1163 (17 pages).

(Continued)

*Primary Examiner* — Matthew K Kwan
(74) *Attorney, Agent, or Firm* — Fujitsu Patent Center

(57) ABSTRACT

A data management system includes an information processing device and a data management device. The information processing device acquires an overall map from a storage in the data management device, estimates a location of the moving object at the time of capturing each of peripheral images that are determined to correspond to any of the key frame images which are stored in the storage among the peripheral images, and generate a local map representing each of the peripheral images which are determined as the key frame image. The management device updates a portion, corresponding to the local map, of the overall map stored in the storage based on the local map.

5 Claims, 28 Drawing Sheets

(51) Int. Cl.
*G09B 29/00* (2006.01)
*G08G 1/14* (2006.01)
*G06T 1/00* (2006.01)
*G01C 21/28* (2006.01)
*G09B 29/10* (2006.01)

(52) U.S. Cl.
CPC ............... *G08G 1/14* (2013.01); *G09B 29/00* (2013.01); *G09B 29/10* (2013.01); *G06T 2207/30264* (2013.01)

(58) Field of Classification Search
USPC .......................................................... 348/113
See application file for complete search history.

(56) References Cited

U.S. PATENT DOCUMENTS

| | | |
|---|---|---|
| 2012/0237085 A1 | 9/2012 | Meier |
| 2013/0010103 A1 | 1/2013 | Ihara et al. |
| 2015/0078624 A1 | 3/2015 | Fukuda |
| 2016/0071415 A1 | 3/2016 | Maeda et al. |

FOREIGN PATENT DOCUMENTS

| | | |
|---|---|---|
| JP | 2008-039687 | 2/2008 |
| JP | 2011-215055 | 10/2011 |
| JP | 2011-227874 | 11/2011 |
| JP | 2013-209015 | 10/2013 |
| JP | 2015-084229 | 4/2015 |
| JP | 2016-053905 | 4/2016 |

OTHER PUBLICATIONS

Raul Mur-Artal and Juan D. Tardos, "Fast Relocalisation and Loop Closing in Keyframe-Based SLAM", 2014 IEEE International Conference on Robotics & Automation(ICRA) May 31-Jun. 7, 2014, pp. 846-853 (8 pages).

V. Lepetit et al., "EPnP: An Accurate O(n) Solution to the PnP Problem", International Journal of Computer Vision, vol. 81, No. 2, pp. 155-166 (2008) (12 pages).

Zhengyou Zhang, "A Flexible New Technique for Camera Calibration", IEEE Transactions on Pattern Analysis and Machine Intelligence, vol. 22, No. 11, Nov. 2000, pp. 1330-1334 (5 pages).

R. I. Hartley et al., "Triangulation", Computer Vision and Image Understanding, vol. 68, No. 2, Nov. 1997, pp. 146-157 (12 pages).

H. Kato et al., "Marker Tracking and HMD Calibration for a Video-based Augmented Reality Conferencing System", In Proc. of IEEE and ACM International Workshop on Augmented Reality (IWAR), pp. 85-94, 1999 (10 pages).

International Search Report, mailed in connection with PCT/JP2018/000833 and dated Apr. 10, 2018 (1 page).

* cited by examiner

FIG. 7

| KEY FRAME ID | LOCATION AND POSTURE OF VEHICLE | KEY FRAME IMAGE | FEATURE POINT [pixel] | MAP POINT ID CORRESPONDING TO FEATURE POINT |
|---|---|---|---|---|
| 001 | (0.24, 0.84, 0.96, 245.0, 313.9, 23.8) | (24, 46, ...) | (11, 42), (29, 110), (178, 90), (242, 310), ... | 3, 5, 9, 32, ... |
| 002 | (0.15, 0.90, 0.23, 93.3, 163.0, 73.2) | (25, 44, ...) | (92, 32), (41, 88), (201, 11), (231, 290), ... | 2, 11, 43, 51, ... |
| 003 | (0.64, 0.45, 0.12, 132.8, 77.3, 61.8) | (22, 40, ...) | (13, 27), (32, 38), (42, 103), (85, 55), ... | 4, 7, 28, 37, ... |
| ... | ... | ... | ... | ... |
| 025 | (0.54, 0.80, 0.92, 398.2, 310.2, 292.0) | (134, 89, ...) | (55, 120), (173, 193), (103, 167), (236, 262), ... | 32, 35, 58, 62, ... |

FIG. 8

| MAP POINT ID | X[m] | Y[m] | Z[m] | FEATURE QUANTITY |
|---|---|---|---|---|
| 001 | 0.126 | 0.059 | 0.329 | (0.264, ...) |
| 002 | 0.314 | 0.193 | 0.289 | (0.822, ...) |
| 003 | 0.212 | 0.049 | 0.315 | (0.652, ...) |
| ... | ... | ... | ... | ... |
| 068 | −0.237 | −0.021 | 0.291 | (0.740, ...) |

# INFORMATION PROCESSING DEVICE, DATA MANAGEMENT DEVICE, DATA MANAGEMENT SYSTEM, METHOD, AND PROGRAM

CROSS-REFERENCE TO RELATED APPLICATION

This application is a continuation application of International Application PCT/JP2018/000833 filed on Jan. 15, 2018 and designated the U.S., the entire contents of which are incorporated herein by reference. The International Application PCT/JP2018/000833 is based upon and claims the benefit of priority of the prior Japanese Patent Application No. 2017-016252, filed on Jan. 31, 2017, the entire contents of which are incorporated herein by reference.

FIELD

The embodiments discussed herein are related to an information processing device, a data management device, a data management system, a method, and a program.

BACKGROUND

A specifying method of specifying an image-capture location of a landscape image using electronic map data is known. In the specifying method, the electronic map data includes arrangement location data indicating an arrangement location of at least a road among a road and a structure arranged on a map and shape data indicating a plane shape of at least the road among the road and the structure. The landscape image includes at least a road among a road and a structure adjacent to the road. Steps performed by a computer for the specifying method include acquiring the landscape image, analyzing the landscape image, and obtaining a predetermined feature quantity relating to an appearance in at least one of the road and the structure. The feature quantity at a plurality of predetermined evaluation locations on the map is extracted with reference to the electronic map data. Based on the obtained feature quantity and the extracted feature quantity, a candidate place of the image-capture location is estimated.

A host vehicle location detection system capable of efficiently detecting a host vehicle location while using a landscape image recognition technology is also known. The host vehicle location detection system includes a reference data database which stores image feature point data generated by extracting an image feature point from a captured image obtained by capturing an image of a landscape from a vehicle and reference data associated with an image-capture location of the captured image corresponding to the image feature point data. The host vehicle location detection system receives an actual image of the landscape captured by an in-vehicle camera and outputs matching data generated by extracting an image feature point from the actually captured image. The host vehicle location detection system acquires vehicle behavior data indicating an actual vehicle behavior which is a vehicle behavior of the vehicle. The host vehicle location detection system extracts preliminary reference data in which the periphery of the estimated vehicle location is used as the image-capture location from the reference data database, with the estimated host vehicle location of the vehicle as an extraction condition. The host vehicle location detection system narrows down the reference data from the preliminary reference data based on the actual vehicle behavior, and outputs the data as a matching partner candidate for the matching data. The host vehicle location detection system performs matching between the output reference data and the matching data and determines a location of the host vehicle based on the image-capture location associated with the reference data succeeded in the matching.

A vehicle location estimation device which may accurately detect an absolute location of a host vehicle is also known. The vehicle location estimation device detects the absolute location of the host vehicle with a predetermined accuracy and detects a relative location of a surrounding mark based on the absolute location of the host vehicle. The vehicle location estimation device estimates the absolute location of the mark with the smallest error based on the absolute location of the host vehicle and the relative location of the mark detected a plurality of times and estimates the absolute location of the host vehicle based on the absolute location of the mark and the relative location of the mark.

A road map updating system that sequentially updates road map data to more useful content is known. A vehicle side device of the road map updating system is mounted on a vehicle and creates and transmits a travel track. A map management device of the road map updating system includes a map data management server that stores center side road map data in an updatable manner, receives a travel track transmitted from the vehicle side device, and updates the center side road map data. The vehicle side device sequentially detects a current location of the vehicle. The vehicle side device sequentially determines whether or not a road on which the vehicle travels is a new road not included in the road map data. The vehicle side device transmits a peripheral image of the vehicle captured by an in-vehicle camera to the map management device if it is determined that the road is a new road.

A method of determining a posture of a camera relating to an actual environment is also known. At least one item or several items of information are used to determine at least one parameter of an environment situation of the camera, and a day, a year, weather, particularly rain, cloud, sunlight, and the like are used as the items. Data or parameters relating to an environmental condition are used to generate a model set for various different environmental conditions.

Japanese Laid-open Patent Publication No. 2005-173748, Japanese Laid-open Patent Publication No. 2011-215055, Japanese Laid-open Patent Publication No. 2007-303842, Japanese Laid-open Patent Publication No. 2008-039687, and Japanese Laid-open Patent Publication No. 2015-084229 are examples of related art.

For example, in a case where a location of a vehicle which is an example of a moving object is estimated, it is desirable to refer to a map of a peripheral region of the vehicle. Since the peripheral region of the vehicle in a real world changes from moment to moment, a location of the vehicle may not be accurately estimated even if the map is referred to. Accordingly, it is conceivable to hold a plurality of maps for each state of the peripheral region of the vehicle, but the amount of map to be held increases.

According to one aspect, a disclosed technique aims to reduce the amount of map representing a target region.

SUMMARY

According to an aspect of the embodiments, a data management system includes an information processing device and a data management device. The information processing device acquires an overall map from a storage in the data management device, estimates a location of the moving object at the time of capturing each of peripheral images that are determined to correspond to any of the key frame images which are stored in the storage among the peripheral images, and generate a local map representing each of the peripheral images which are determined as the key frame image. The management device updates a portion, corresponding to the local map, of the overall map stored in the storage based on the local map.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of a key frame table;

FIG. 8 is a diagram illustrating an example of a map point table;

DESCRIPTION OF EMBODIMENTS

Hereinafter, an example of one embodiment of a disclosed technology will be described in detail with reference to the drawings.

First Embodiment

Figure 1:
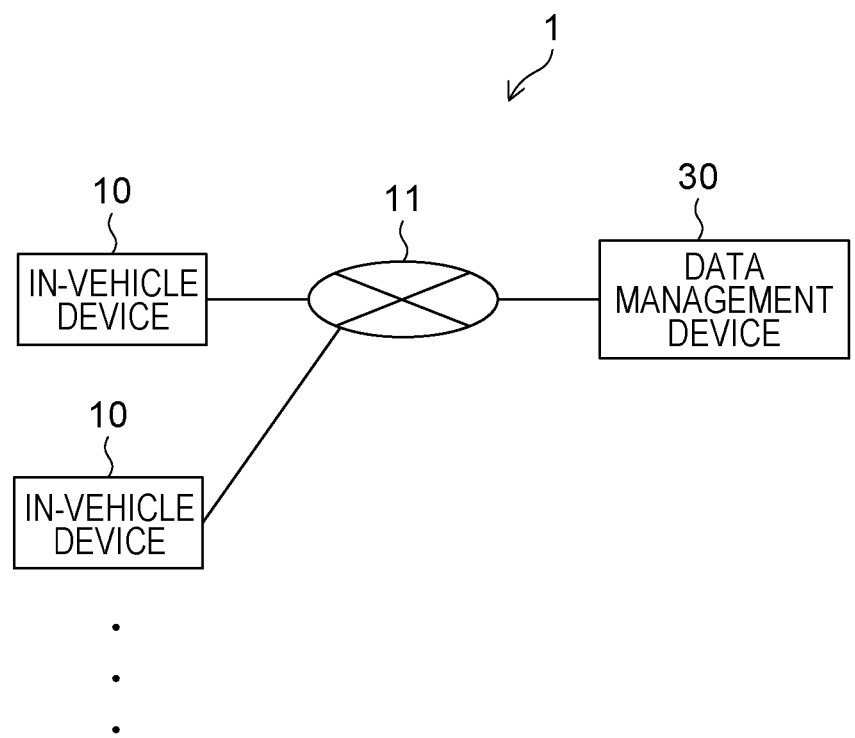
FIG. 1 is a schematic block diagram of a data management system according to the present embodiment.

FIG. 1 illustrates a rough diagram illustrating the configuration example of the data management system 1. In this embodiment, the case where the moving body is a vehicle and the parking lot is a target region is illustrated, and in this embodiment, a data management system for updating the overall map in the parking lot is illustrated.

As illustrated in FIG. 1, a data management system 1 according to the present embodiment includes a plurality of in-vehicle devices 10 and a data management device 30. The plurality of in-vehicle devices 10 and the data management device 30 are connected to each other via a network 11 such as the Internet. The in-vehicle device is an example of an information processing device of the disclosed technology.

Figure 2:
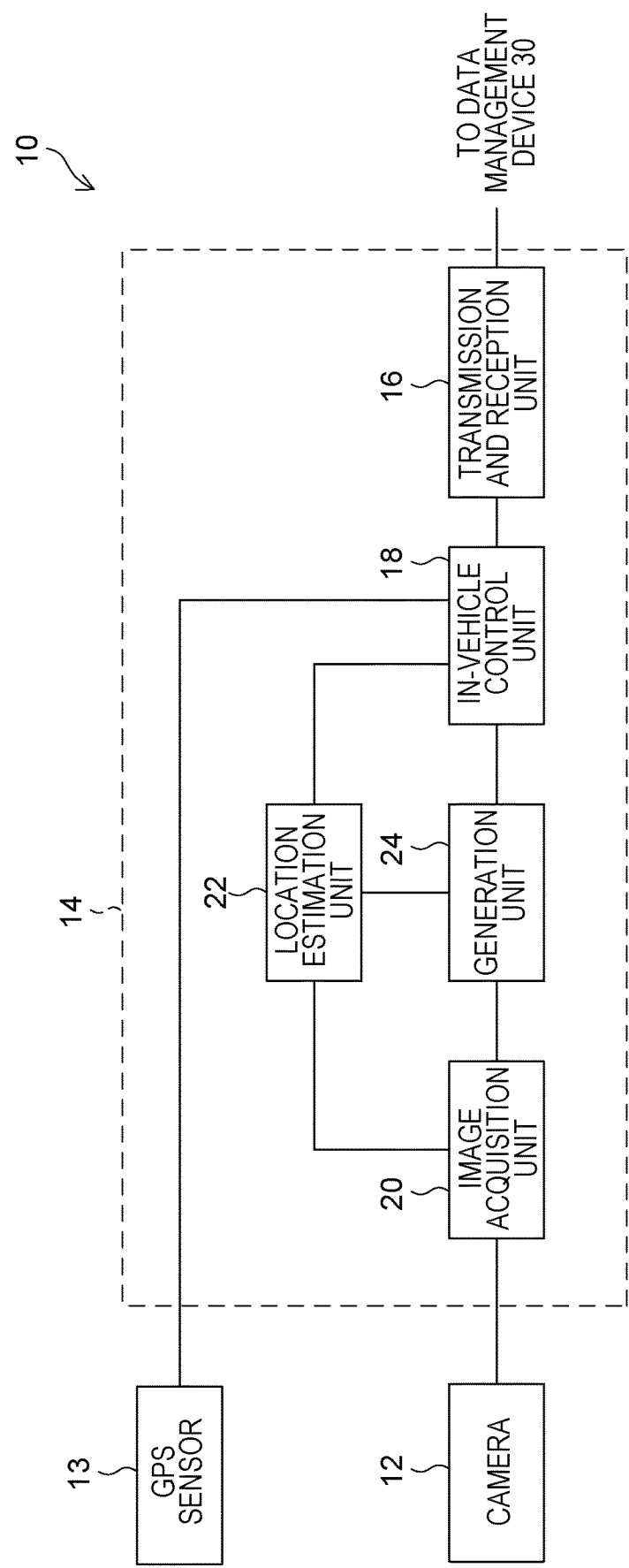
FIG. 2 is a schematic block diagram of an in-vehicle device according to a first embodiment.

The in-vehicle device 10 illustrated in FIG. 2 includes a camera 12, a GPS sensor 13, and a control unit 14. The in-vehicle device 10 generates a local map around a vehicle based on predetermined information received from a data management device 30 which will be described below and a peripheral image of the vehicle captured by the camera 12 and transmits the local map to the data management device 30. As illustrated in FIG. 2, the control unit 14 includes a transmission and reception unit 16, an in-vehicle control unit 18, an image acquisition unit 20, a location estimation unit 22, and a generation unit 24. The in-vehicle control unit 18 is an example of an acquisition unit of the disclosed technology.

Figure 3:
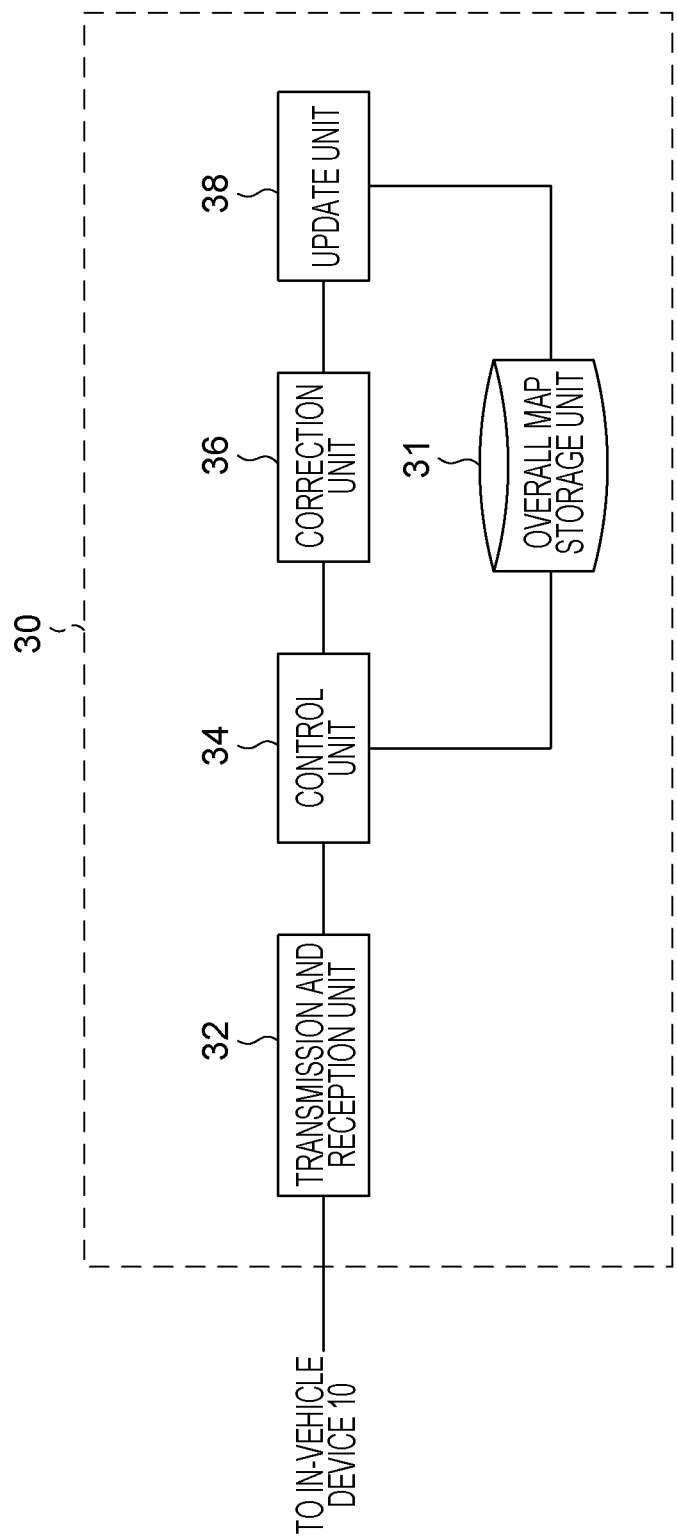
FIG. 3 is a schematic block diagram of a data management device according to the first embodiment.

The data management device 30 illustrated in FIG. 3 includes an overall map storage unit 31, a transmission and reception unit 32, a control unit 34, a correction unit 36, and an update unit 38. The data management device 30 updates the overall map stored in the overall map storage unit 31 based on a local map transmitted from the in-vehicle device 10.

The overall map storage unit 31 of a data management device 30 stores an overall map illustrating an overall parking lot.

Figure 4:
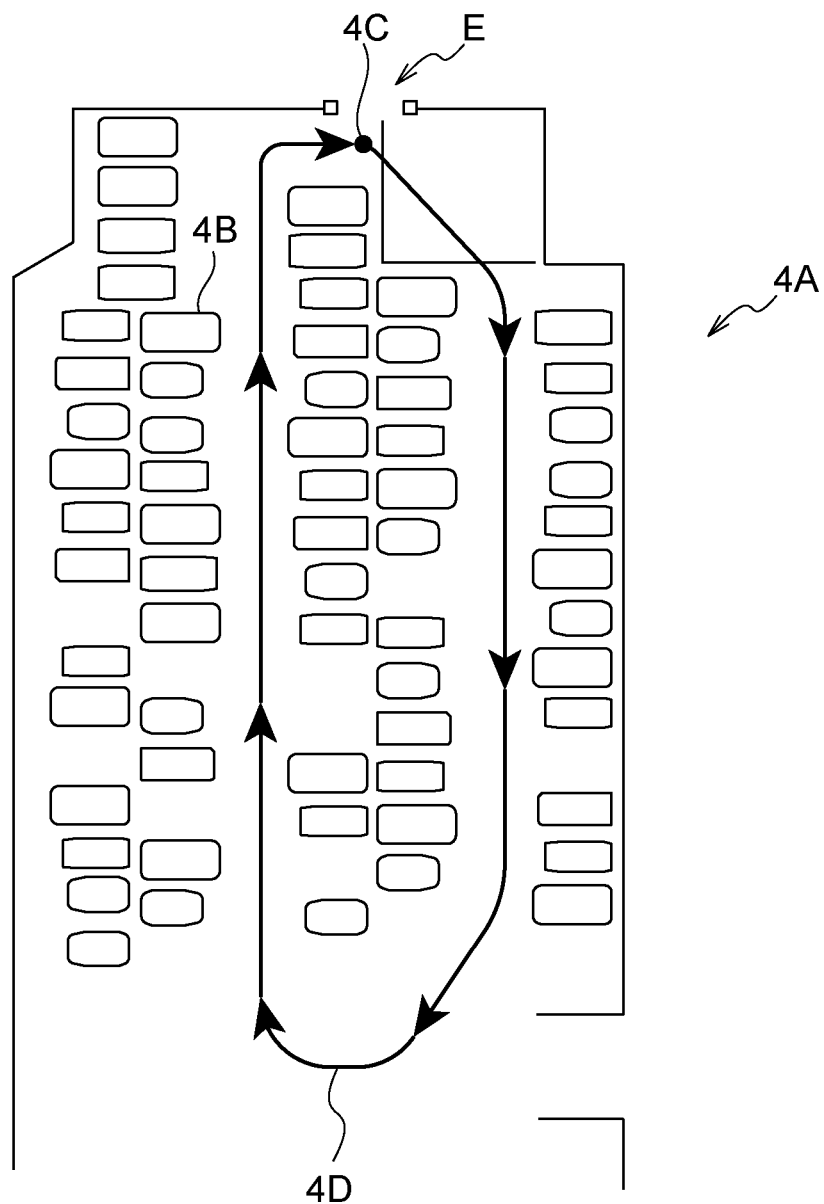
FIG. 4 is an explanatory diagram illustrating an overall map of a parking lot.

The overall map of the parking lot will be described. For example, as illustrated in FIG. 4, if a parking lot 4A is set as the whole of a target region, a plurality of vehicles 4B are parked in the parking lot 4A. A vehicle parking in the parking lot 4A enters from an entrance E of the parking lot 4A and starts to travel from a start point 4C. The vehicle travels according to, for example, a travel locus 4D and parks in a predetermined empty space.

If parking of the vehicle illustrated in FIG. 4 is performed by for example, automatic drive, it is desirable to prepare an overall map illustrating the whole parking lot in advance. In the overall map, for example, each key frame image representing an image captured by a camera mounted on a vehicle according to a location of the vehicle, each location of the vehicle when the key frame image is captured, and three-dimensional coordinates of each feature point of the key frame image are associated with each other.

For example, the key frame image is an image captured by the camera mounted on the vehicle when the vehicle travels along the travel locus 4D illustrated in FIG. 4. The key frame image is stored in the overall map at every predetermined interval in the travel locus. The three-dimensional coordinates of the feature point of the key frame image are stored in the overall map together with the key frame image.

The overall map includes a key frame and a map point. The key frame is information in which each key frame image and each location of the vehicle when the key frame image is captured are associated with each other. The key frame is stored in the overall map as information along the travel locus of the vehicle. The map point represents three-dimensional coordinates of each feature point of the key frame image. The feature point represents, for example, a shape of an object existing in a target region and is an edge point and the like in the key frame image.

Figure 5:
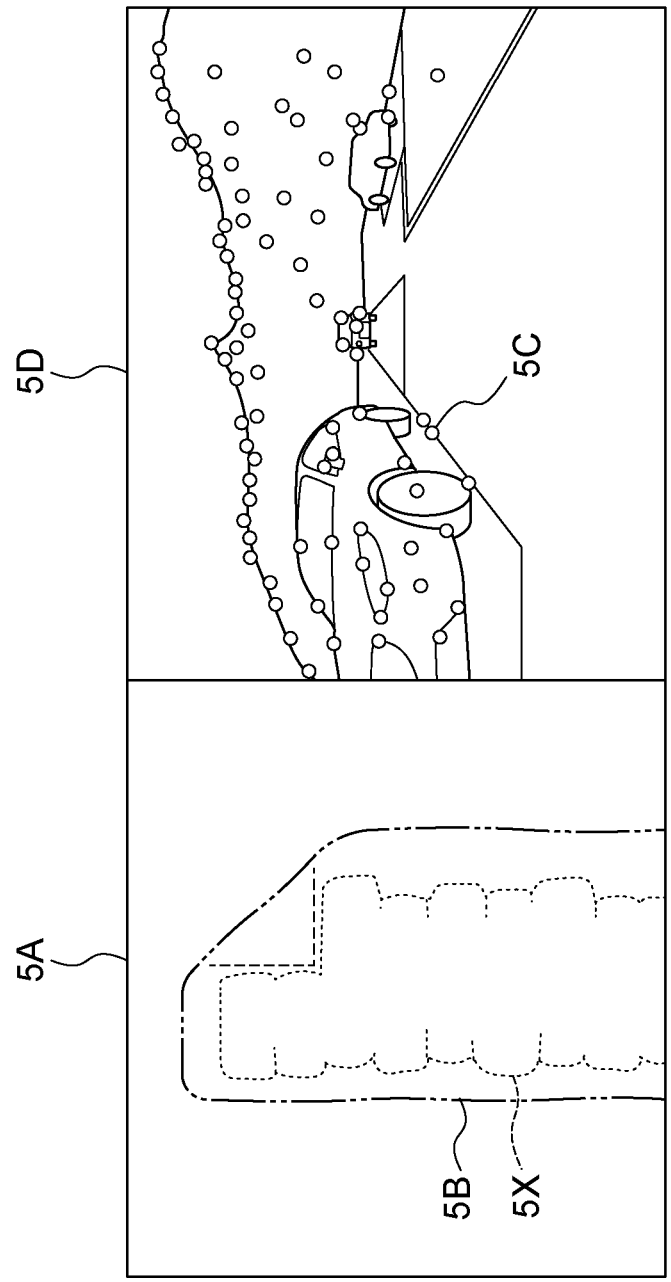
FIG. 5 is an explanatory diagram illustrating a key frame.

FIG. 5 is an explanatory diagram illustrating an overall map. The overall map 5A in FIG. 5 is a part of the overall map of the parking lot 4A in FIG. 4. The key frame is stored in the overall map 5A at each predetermined interval in the travel locus 5B of the overall map. For example, an image 5D representing one example of the key frame image is given a feature point 5C of the image.

For example, when the vehicle travels on a travel locus 5B in FIG. 5, images are sequentially captured by the camera 12 of the in-vehicle device 10 mounted on the vehicle. The in-vehicle device 10 associates a feature point of a peripheral image of the vehicle captured by the camera 12 with a map point 5X corresponding to the feature point 5C of the key frame image of the overall map, and estimates a location and a posture of the vehicle.

A parking state of the vehicle in the parking lot changes from hour to hour. Accordingly, if parking is performed by automatic drive, for example, a plurality of overall maps corresponding to the parking state may be considered to be prepared in advance. However, if the plurality of overall maps are managed according to the parking state, the number of overall maps is increased. If a specific overall map corresponding to a situation around the vehicle is selected from the plurality of overall maps, how to select the overall map becomes a problem. For example, since the feature points change depending on a type and a direction of the parked vehicle, it is difficult to select a specific overall map.

In the present embodiment, the in-vehicle device 10 generates a local map based on a peripheral image of the vehicle, and the overall map is sequentially updated based on the local map generated by the in-vehicle device 10.

Figure 6:
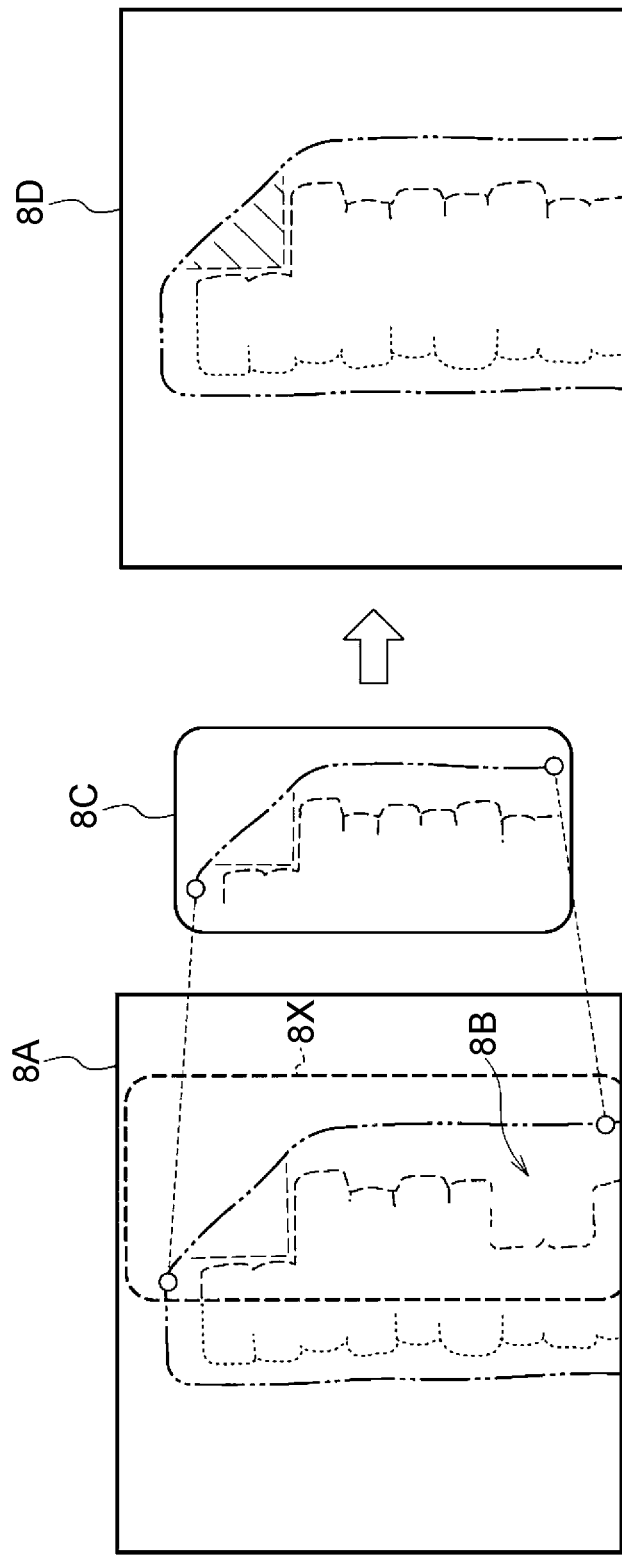
FIG. 6 is an explanatory diagram illustrating processing of updating the overall map based on a local map.

For example, the in-vehicle device 10 according to the present embodiment generates a local map 8C corresponding to a specific region 8X in the overall map 8A of the parking lot as illustrated in FIG. 6. The data management device 30 updates the overall map 8A based on the local map 8C. For example, if the vehicle is parked in the latest state in a space that is the empty space 8B in the overall map 8A, the overall map 8A is updated based on the local map 8C, and thereby, the overall map 8D representing the latest parking lot state is obtained. As such, the overall map is updated based on the local map sequentially generated by the in-vehicle device 10.

The overall map storage unit 31 stores the overall map. For example, the overall map is represented by a key frame table and a map point table, and the key frame table and the map point table are stored in the overall map storage unit 31 as the overall map.

The key frame table illustrated in FIG. 7 stores a key frame ID representing identification information of a key frame, a location and a posture of a vehicle, a key frame image captured by a camera, a feature point in the key frame image, and a map point ID corresponding to the feature point in association with each other. For example, the location and the posture of the vehicle corresponding to the key frame ID "001" in the key frame table of FIG. 7 are six-dimensional real values indicating 0.24, 0.84, 0.96, 245.0, 313.9, and 23.8 as illustrated in FIG. 7. Among the six-dimensional real values, 0.24, 0.84, and 0.96 represent the posture of the vehicle and 245.0, 313.9, and 23.8 represent the three-dimensional location of the vehicle. Information of one row of the key frame table represents one key frame.

Key frame images 24 and 46, . . . corresponding to the key frame ID "001" of the key frame table illustrated in FIG. 7 represents an image value of each pixel of the key frame image. The feature points "11 and 42, 29 and 110, . . . " corresponding to the key frame ID "001" of the key frame table of FIG. 7 represent a pixel location corresponding to the location of the feature point in the key frame image. Map point IDs "3, 5, 9, 32 . . . " corresponding to the key frame ID "001" in the key frame table of FIG. 7 represent the map point ID corresponding to each feature point. The map point ID corresponds to the map point ID of the map point table.

The map point table illustrated in FIG. 8 stores a map point ID representing the identification information of the map point, a three-dimensional location coordinate X[m], Y[m], and Z[m] of the map point, and a feature quantity of the map point ID in association with each other. For example, the feature quantity of the map point table illustrated in FIG. 8 is, for example, scale-invariant feature transform (SIFT) or the like, and is represented by a 64-dimensional vector or the like.

For example, a method described in Reference Document 1 can be used as a method for generating an overall map in advance.

Reference document 1: Ra'ul Mur-Artal, J. M. M. Montiel, Member, IEEE, and Juan D. Tard'os, Member, IEEE, "ORB-SLAM: A Versatile and Accurate Monocular SLAM System", IEEE TRANSACTIONS ON ROBOTICS, VOL. 31, NO. 5, OCTOBER 2015.

For example, a control unit 34 of a data management device 30 generates the overall map.

For example, the control unit 34 of the data management device 30 generates an initial overall map representing a key frame and a map point of a peripheral image of the point where the camera starts to capture an image, based on the image acquired from certain two viewpoints by the camera mounted in the vehicle. Next, the control unit 34 estimates a location and a posture of the vehicle in each image based on a plurality of images captured by the camera in the vehicle when the vehicle takes a turn in the parking lot. Then, the control unit 34 matches corresponding feature points in pairs of adjacent images based on the plurality of images captured when the vehicle takes a turn in the parking lot and calculates a three-dimensional coordinate of the map point corresponding to the feature point. Thereby, an overall map representing the overall parking lot is generated.

Hereinafter, respective functional units of the in-vehicle device 10 and the data management device 30 relating to processing in which the in-vehicle device 10 updates the overall map based on the local map based on the peripheral of the vehicle will be specifically described.

The camera 12 of the in-vehicle device 10 illustrated in FIG. 2 sequentially captures peripheral images of the vehicle. The GPS sensor 13 sequentially detects location information of the vehicle.

The in-vehicle control unit 18 determines whether or not the vehicle enters a predetermined parking lot based on the location information of the vehicle detected by a GPS sensor 13, and if it is determined that the vehicle enters the predetermined parking lot, the in-vehicle control unit 18 transmits a control signal to the data management device 30 via the transmission and reception unit 16.

The transmission and reception unit 32 of a data management device 30 illustrated in FIG. 3 receives the control signal transmitted from the data management device 30. The control unit 34 transmits the overall map stored in the overall map storage unit 31 to the in-vehicle device 10 via the transmission and reception unit 32 in response to the control signal received by the transmission and reception unit 32.

The transmission and reception unit 16 of the in-vehicle device 10 illustrated in FIG. 2 receives the overall map transmitted from the data management device 30. Then, the in-vehicle control unit 18 outputs the overall map received by the transmission and reception unit 16 to the location estimation unit 22.

The image acquisition unit 20 sequentially acquires a peripheral image of the vehicle captured by the camera 12.

The location estimation unit 22 estimates a location and a posture of the vehicle based on the key frame image of the overall map output from the in-vehicle control unit 18 and peripheral images sequentially captured by the camera 12 acquired by the image acquisition unit 20. First, the location estimation unit 22 estimates an initial location and an initial posture of the vehicle.

For example, the location estimation unit 22 can estimate an initial location and an initial posture of the vehicle by using the method described in Reference Document 2.

Reference Document 2: Ra'ul Mur-Artal and Juan D. Tard'os, "Fast Relocalisation and Loop Closing in Keyframe-Based SLAM", 2014 IEEE International Conference on Robotics & Automation (ICRA) May 31-Jun. 7, 2014. Hong Kong, China.

The location estimation unit 22 decreases the peripheral image at an initial time and a plurality of key frame images acquired by the image acquisition unit 20 to a predetermined size. The peripheral image at the initial time represents a peripheral image captured for the first time when the vehicle enters the parking lot. Next, the location estimation unit 22 applies a Gaussian filter to the peripheral image at the initial time and the plurality of key frame images. Then, the location estimation unit 22 calculates a sum of squared distances (SSD) of each pixel of the peripheral image at the initial time and each pixel of the key frame image, with respect to each of the plurality of key frame images. Then, the location estimation unit 22 selects the key frame image having the smallest SSD value.

Next, the location estimation unit 22 extracts a feature point from the peripheral image at the initial time. The location estimation unit 22 matches the feature point extracted from the peripheral image at the initial time with a feature point in the selected key frame image. Then, the location estimation unit 22 associates the feature point of the peripheral image with a map point corresponding to the feature point of the key frame image according to the matching result. By associating the feature points of the peripheral image with the feature point of the key frame image by matching each other, the feature point of the peripheral image and the map points of the key frame are associated with each other. For example, the location estimation unit 22 associates a pair of feature points having the maximum similarity of the feature quantity of the feature point and having the similarity equal to or greater than a threshold (for example, 0.8). For example, a Hamming distance is used if the feature quantity is ORB, and an L2 norm is used if the feature quantity is SIFT, as the similarity.

Next, the location estimation unit 22 calculates the location and the posture of the camera by using a PnP algorithm described in Reference Document 3, based on the association result between the feature point of the peripheral image at the initial time, the feature point of the key frame image, and the map point and an internal parameter of the camera 12. For example, first, the location estimation unit 22 generates a projection point by projecting the map point associated with the feature point of the peripheral image onto the peripheral image. The location estimation unit 22 calculates the location and the posture of the camera 12 such that a distance between the projection point of the peripheral image and the feature point is minimized. By calculating the location and the posture of the camera 12, an initial location and an initial posture of the vehicle on which the camera 12 is mounted are estimated.

Reference Document 3: V. Lepetit et al., "EPnP: An Accurate O(n) Solution to the PnP Problem", International Journal of Computer Vision, Vol. 81, No. 2, pp. 155-166(2008).

The internal parameter of the camera 12 is previously acquired by calibration based on a method described in, for example, Reference Document 4.

Reference Document 4: Z. Zhang et al., "A flexible new technique for camera calibration", IEEE Transactions on Pattern Analysis and Machine Intelligence, 22(11): 1330-1334, 2000.

Next, the location estimation unit 22 estimates the location and the posture of the vehicle when the vehicle is moving based on a time series of the peripheral images captured during movement of the vehicle acquired by the image acquisition unit 20.

For example, the location estimation unit 22 first extracts a feature point from the peripheral image at the current time acquired by the image acquisition unit 20. Next, the location estimation unit 22 calculates the location of the vehicle corresponding to the peripheral image at the current time based on the peripheral image at the previous time on the assumption that the vehicle performs a predetermined motion model (for example, uniform motion).

The location estimation unit 22 associates the map point of the peripheral image at the previous time with the feature point of the peripheral image at the current time based on the location of the vehicle corresponding to the peripheral image at the current time. The map point of the peripheral image at the previous time is generated for the peripheral image at the previous time by the generation unit 24 to be described below.

The location estimation unit 22 calculates the location and the posture of the camera 12 at the current time by using the PnP algorithm described in Reference Document 3 from the association result of the feature point of the peripheral image at the current time and the map point of the peripheral image at the previous time. The location and the posture of the vehicle on which the camera 12 is mounted are estimated by calculating the location and the posture of the camera 12.

The generation unit 24 determines whether or not to adopt each of the peripheral images at each time as the key frame image. The generation unit 24 calculates the map point indicating a three-dimensional coordinate of each feature point of the peripheral image, based on the location of the vehicle estimated by the location estimation unit 22 and the peripheral image determined as the key frame image in the previous processing of the generation unit 24. The generation unit 24 generates a local map representing the map point indicating the three-dimensional coordinates of each of the peripheral images determined as the key frame image in the previous processing of the generation unit 24, each of the estimated location of the vehicle, and each of the feature points of the peripheral image.

When determining whether or not to adopt each of the peripheral images at each time as the key frame image, the generation unit 24 determines quality of the posture of the vehicle estimated by the location estimation unit 22. For example, the generation unit 24 calculates a score S of the quality relating to the posture estimation of the vehicle by the location estimation unit 22 according to the following Equation (1).

$$S = \text{(the number of points where the map point at the previous time matches the feature point at the current time)} / \text{(the number of points where matching is attempted between the map point at the previous time and the feature point at the current time)} \quad (1)$$

If the score S of quality is equal to or greater than a threshold (for example, 0.3), the generation unit 24 determines that posture estimation of the vehicle performed by the location estimation unit 22 is high in quality. If the posture estimation of the vehicle performed by the location estimation unit 22 is high in quality and the peripheral image satisfies a predetermined condition, the generation unit 24 sets the peripheral image as a key frame image. The generation unit 24 determines whether or not to set the peripheral image as the key frame image depending on whether or not a regular interval (for example, 20 frames) is opened from the peripheral image adopted as a previous key frame image as the predetermined condition.

Next, the generation unit 24 calculates the map point indicating the three-dimensional coordinate of each of the feature points of the newly set key frame image by performing three-dimensional restoration of the feature point using triangulation. For example, the generation unit 24 calculates the map point of the newly set key frame image by using a method described in Reference Document 5, based on each location of the vehicle, the newly set key frame image, and the key frame image set up to the previous time.

Reference Document 5: R. I. Hartley et al., "Triangulation, Computer Vision and Image Understanding", Vol. 68, No. 2, pp. 146-157, 1997.

The generation unit 24 selects the nearest key frame image closest to the location of the newly set key frame image from among the key frame images set up to the previous time, based on each of the locations of the vehicle associated with the key frame image. Next, the generation unit 24 calculates the map point of a new key frame image from the feature point of the new key frame image and the map point of the nearest key frame, and a relative posture between the posture of the vehicle in the new key frame image and the posture of the vehicle in the closest key frame image.

The generation unit 24 adds the newly set key frame image, the location of the vehicle corresponding to the newly set key frame image, and the map point of the newly set key frame image to the local map.

The generation unit 24 generates a local map corresponding to a travel of the vehicle by repeating estimation of the location of the vehicle performed by the location estimation unit 22, determination of the key frame image, and generation of the map point until an external signal indicating that the vehicle stops is detected.

The in-vehicle control unit 18 of the in-vehicle device 10 transmits the local map generated by the generation unit 24 to the data management device 30 via the transmission and reception unit 16.

The transmission and reception unit 32 of a data management device 30 illustrated in FIG. 3 receives the local map transmitted from the in-vehicle device 10. The control unit 34 outputs the local map received by the transmission and reception unit 32 to the correction unit 36.

The correction unit 36 reidentifies the location of the vehicle from the key frame image included in the local map output from the control unit 34. The correction unit 36 corrects each of the locations of the vehicle represented by the local map and the map point of the key frame, based on the local map output from the control unit 34 and the location of the reidentified vehicle.

For example, the correction unit 36 reidentifies a stop location of the vehicle by using a relocalization algorithm described in Reference Document 2, based on the key frame image closest to the stop location of the vehicle in the local map. Next, the correction unit 36 converts the coordinates of the local map such that a start point of the local map coincides with a start point of the overall map stored in the overall map storage unit 31.

Next, the correction unit 36 generates a graph structure based on the key frame closest to the stop location of the vehicle in the local map, each of the predetermined key frames, and the key frame corresponding to the reidentified location of the vehicle.

The correction unit 36 corrects the location and posture of the vehicle in each of the key frame closest to the stop location of the vehicle in the local map and the predetermined key frame by using a graph optimization method described in Reference Document 2.

Figure 9:
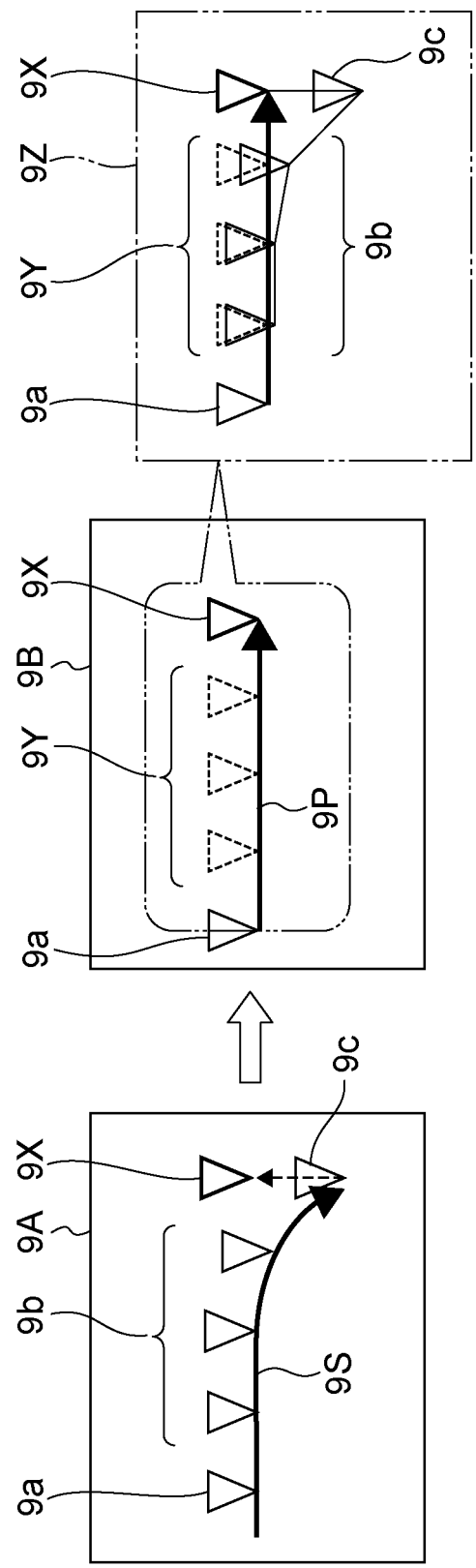
FIG. 9 is an explanatory diagram illustrating correction of a location of the key frame of the local map.

For example, as illustrated in FIG. 9, a case where each of the key frames 9a, 9b, and 9c is obtained in the local map 9A will be described as an example. In this case, a key frame 9a represents the key frame at the start point. A key frame 9c represents the key frame closest to the stop location of the vehicle. A key frame 9b is the key frame located between the key frame 9a and the key frame 9c. 9S represents a travel locus of the vehicle estimated in the local map which is not corrected. A key frame 9X represents the stop location of the vehicle reidentified by the correction unit 36.

During generation of the local map transmitted from the in-vehicle device 10, the location and posture of the vehicle are estimated based on a time series of the peripheral images captured while the vehicle is moving according to the location estimation unit 22. However, there is a case where errors are accumulated at the time of estimation processing based on the time series of the peripheral images of the vehicle and the location and posture of the vehicle may not be accurately estimated. Accordingly, a correspondence relation between the location and posture of the vehicle of the key frame in the generated local map and the key frame image may be different from the real world.

In the present embodiment, the correction unit 36 corrects the key frame based on a location 9a of the vehicle at the start point and a location 9X of the reidentified vehicle and obtains a local map 9B as illustrated in FIG. 9. For example, as illustrated in 9Z in FIG. 9, a graph structure is recalculated (1) such that a distance between 9X and 9c becomes 0 and (2) such that movement of another key frame from an original location becomes minimum and corrects each key frame of the local map. By correcting the local map using the correction unit 36, the travel locus 9S which is not corrected becomes the travel locus 9P of the vehicle, and the local map 9B corresponding to the real world is obtained.

The correction unit 36 converts the coordinates of the map points of each key frame of the local map according to the correction of the location and posture of the vehicle of each key frame of the local map.

The update unit 38 updates the overall map stored in the overall map storage unit 31 based on the local map corrected by the correction unit 36.

For example, the update unit 38 deletes the key frame distributed between the key frame corresponding to an initial location of the vehicle and the key frame corresponding to the reidentified location of the vehicle, and the map point corresponding to the distributed key frame. The update unit 38 fits the corrected local map to the deleted portion of the overall map.

Figure 10:
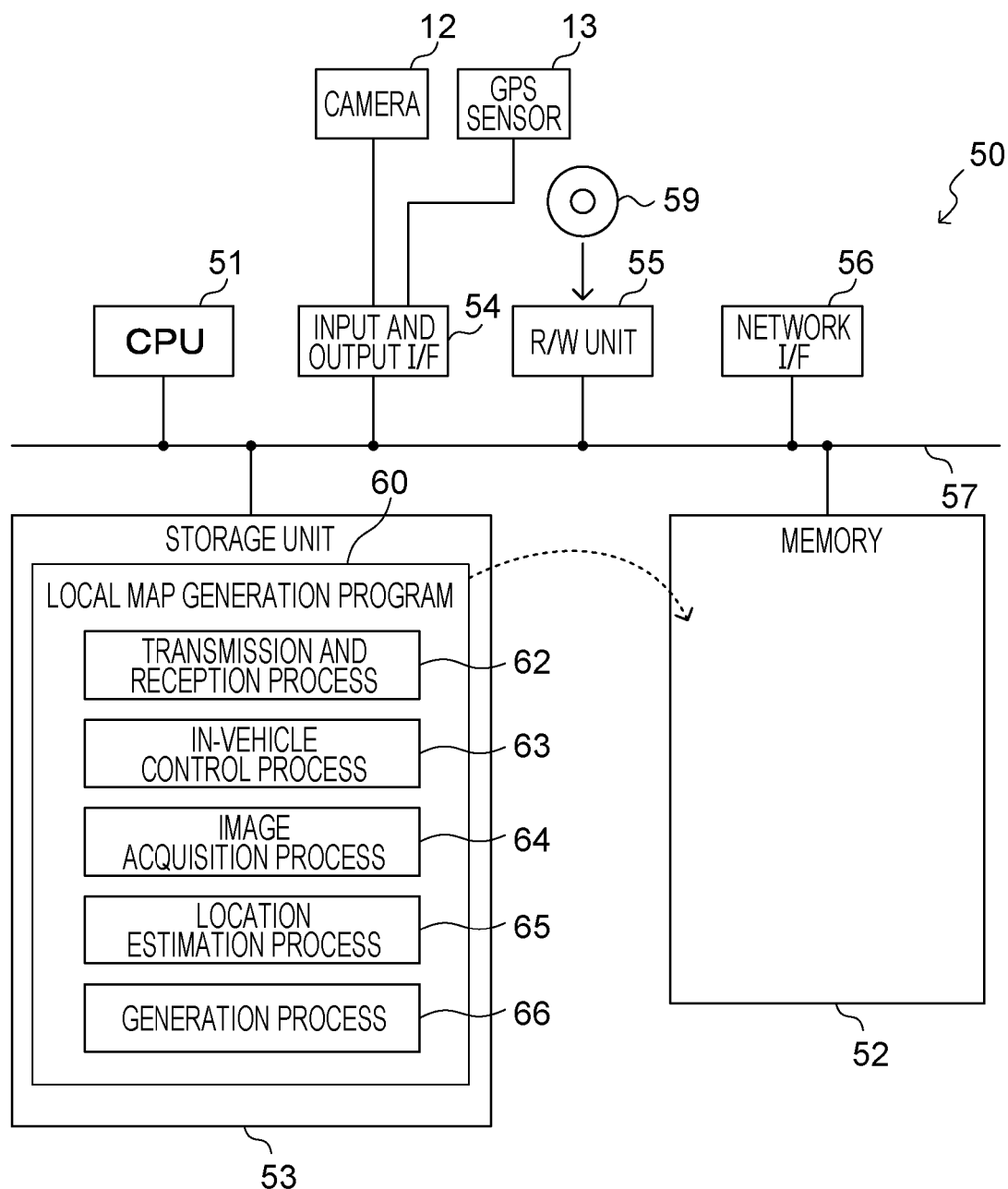
FIG. 10 is a block diagram illustrating a schematic configuration of a computer functioning as a control unit of an in-vehicle device relating to the first embodiment.

The control unit 14 of the in-vehicle device 10 can be realized by, for example, a computer 50 illustrated in FIG. 10. The computer 50 includes a CPU 51, a memory 52 as a temporary storage region, and a nonvolatile storage unit 53. The computer 50 also includes the camera 12, the GPS sensor 13, a display device, an input and output interface (I/F) 54 to which an input and output device and the like (not illustrated) are connected, and a read/write (R/W) unit 55 that controls reading and writing of data from and to a recording medium 59. The computer 50 includes a network I/F 56 connected to a network such as the Internet. The CPU 51, the memory 52, the storage unit 53, the input and output I/F 54, the R/W unit 55, and the network I/F 56 are connected to each other via a bus 57.

The storage unit 53 may be realized by a hard disk drive (HDD), a solid state drive (SSD), a flash memory or the like. The storage unit 53 as a storage medium stores a local map generation program 60 for causing the computer 50 to function as the control unit 14 of the in-vehicle device 10. The local map generation program 60 includes a transmission and reception process 62, an in-vehicle control process 63, an image acquisition process 64, a location estimation process 65, and a generation process 66.

The CPU 51 reads the local map generation program 60 from the storage unit 53 to develop in the memory 52 and sequentially executes processes included in the local map generation program 60. By executing the transmission and reception process 62, the CPU 51 operates as the transmission and reception unit 16 illustrated in FIG. 2. By executing the in-vehicle control process 63, the CPU 51 operates as the in-vehicle control unit 18 illustrated in FIG. 2. By executing the image acquisition process 64, the CPU 51 operates as the image acquisition unit 20 illustrated in FIG. 2. By executing the location estimation process 65, the CPU 51 operates as the location estimation unit 22 illustrated in FIG. 2. By executing the generation process 66, the CPU 51 operates as the generation unit 24 illustrated in FIG. 2. Thereby, the computer 50 that executes the local map generation program 60 functions as the control unit 14 of the in-vehicle device 10. Accordingly, a processor that executes the local map generation program 60 which is software is hardware.

The function realized by the local map generation program 60 can also be realized by, for example, a semiconductor integrated circuit, more specifically, an application specific integrated circuit (ASIC) or the like.

Figure 11:
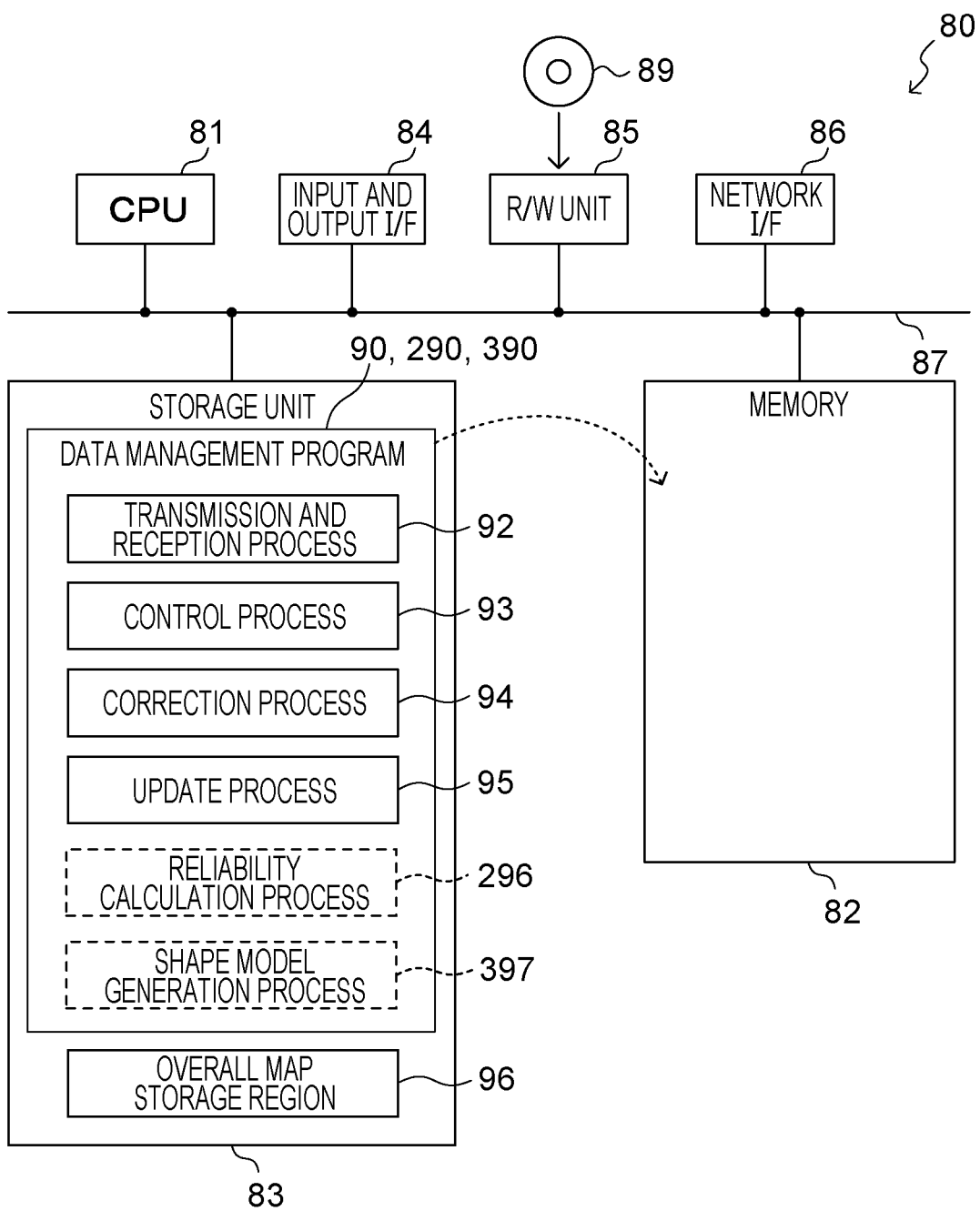
FIG. 11 is a block diagram illustrating a schematic configuration of the computer functioning as a data management device according to the present embodiment.

For example, the data management device 30 may be realized by the computer 80 illustrated in FIG. 11. The computer 80 includes a CPU 81, a memory 82 as a temporary storage region, and a nonvolatile storage unit 83. The computer 80 includes an input and output I/F 84 to which input and output devices (not illustrated) such as a display device and an input device are connected, and an R/W unit 85 that controls reading and writing of data from and to a recording medium 89. The computer 80 includes a network I/F 86 connected to a network such as the Internet. The CPU 81, the memory 82, the storage unit 83, the input and output I/F 84, the R/W unit 85, and the network I/F 86 are connected to each other via a bus 87.

The storage unit 83 may be realized by an HDD, an SSD, a flash memory and the like. The storage unit 83 as a storage medium stores a data management program 90 for causing the computer 80 to function as the data management device 30. A data management program 90 includes a transmission and reception process 92, a control process 93, a correction process 94, and an update process 95. The storage unit 83 includes an overall map storage region 96 for storing information configuring the overall map storage unit 31.

The CPU 81 reads the data management program 90 from the storage unit 83 to develop in the memory 82 and sequentially executes the processes included in the data management program 90. By executing the transmission and reception process 92, the CPU 81 operates as the transmission and reception unit 32 illustrated in FIG. 3. By executing the control process 93, the CPU 81 operates as the control unit 34 illustrated in FIG. 3. By executing the correction process 94, the CPU 81 operates as the correction unit 36 illustrated in FIG. 3. By executing the update process 95, the CPU 81 operates as the update unit 38 illustrated in FIG. 3. The CPU 81 reads information from the overall map storage region 96 and develops the overall map storage unit 31 in the memory 82. Thereby, the computer 80 that executes the data management program 90 functions as the data management device 30. Accordingly, a processor that executes the data management program 90 which is software is hardware.

The function realized by the data management program 90 can be realized by, for example, a semiconductor integrated circuit, more specifically, an ASIC or the like.

Figure 12:
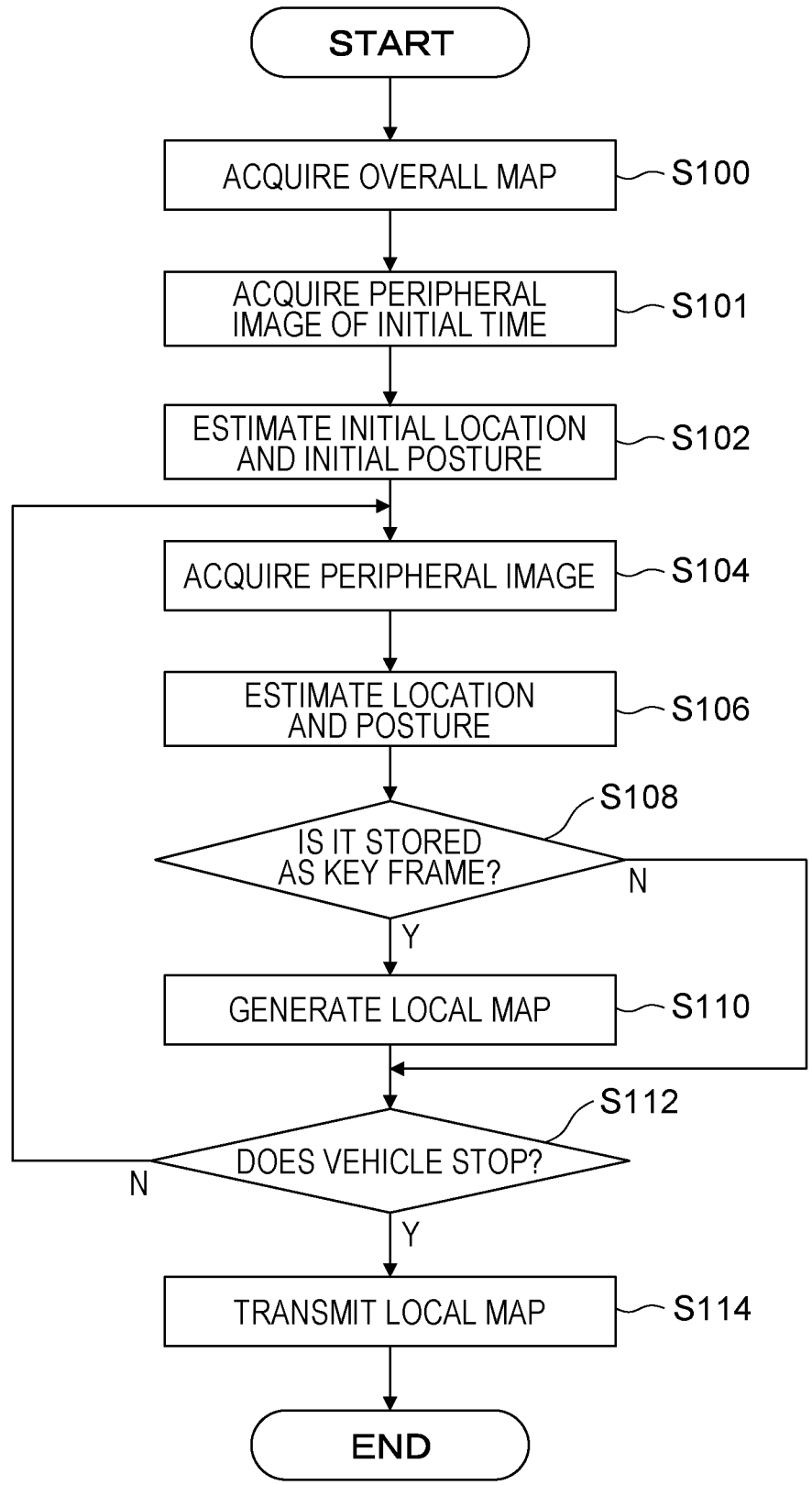
FIG. 12 is a flowchart illustrating one example of local map generation processing according to the first embodiment.

Next, an operation of the data management system 1 according to the present embodiment will be described. In the in-vehicle device 10, the in-vehicle control unit 18 determines whether or not the vehicle enters a predetermined parking lot based on the location information of the vehicle detected by the GPS sensor 13. If it is determined that the vehicle enters the predetermined parking lot, the in-vehicle control unit 18 transmits a control signal to the data management device 30 via the transmission and reception unit 16. The transmission and reception unit 32 of the data management device 30 transmits the overall map stored in the overall map storage unit 31 to the in-vehicle device 10 via the transmission and reception unit 32 according to the control signal transmitted from the in-vehicle device 10. If the transmission and reception unit 16 of the in-vehicle device 10 receives the overall map transmitted from the data management device 30, the control unit 14 of the in-vehicle device 10 executes local map generation processing illustrated in FIG. 12. Each processing will be described in detail below.

In step S100, an in-vehicle control unit 18 acquires an overall map received by the transmission and reception unit 16. The in-vehicle control unit 18 outputs the overall map to a location estimation unit 22.

In step S101, the image acquisition unit 20 acquires a peripheral image at the initial time captured by the camera 12.

In step S102, the location estimation unit 22 estimates an initial location and an initial posture of a vehicle based on the overall map output in step S100 and the peripheral image at the initial time acquired in step S101.

In step S104, the image acquisition unit 20 acquires the peripheral image of the vehicle captured by the camera 12.

In step S106, the location estimation unit 22 estimates the location and posture of the vehicle based on the peripheral image at the current time acquired in step S104 and the peripheral image at the previous time acquired in step S104.

In step S108, the generation unit 24 determines whether or not to set the peripheral image at the current time acquired in step S104 as a key frame image. If the peripheral image at the current time is set as the key frame image, the processing proceeds to step S110. If the peripheral image at the current time is not set as the key frame image, the processing proceeds to step S112.

In step S110, the generation unit 24 calculates a map point indicating three-dimensional coordinates of each feature points of the peripheral image determined as the key frame image in step S108. The generation unit 24 adds the newly set key frame image, the location and posture of the vehicle estimated in step S106, and the map point of the newly set key frame image to the local map.

In step S112, the generation unit 24 determines whether or not an external signal representing that the vehicle stops is detected. If the external signal representing that the vehicle stops is detected, the processing proceeds to step S114. If the external signal representing that the vehicle stops is not detected, the processing returns to step S104.

In step S114, an in-vehicle control unit 18 transmits the local map generated in step S110 to the data management device 30 via the transmission and reception unit 16 and ends the processing.

Figure 13:
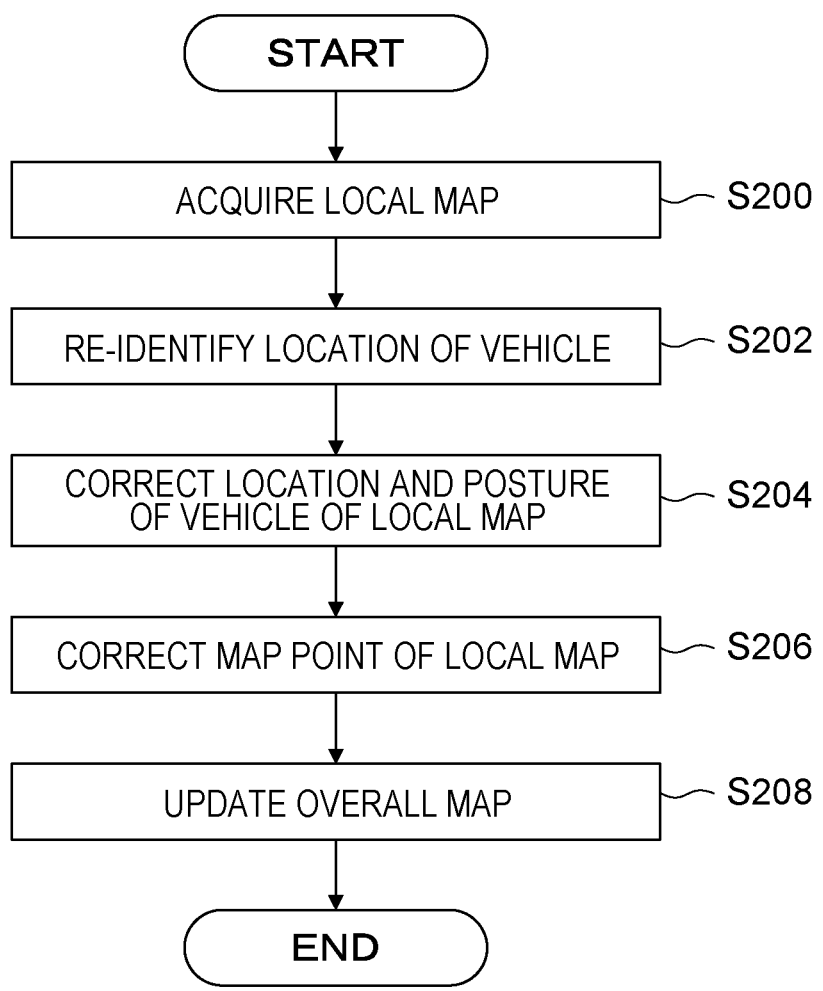
FIG. 13 is a flowchart illustrating an example of data management processing according to the first embodiment.

If the transmission and reception unit 32 of the data management device 30 receives the local map transmitted from the in-vehicle device 10, the data management device 30 executes data management processing illustrated in FIG. 13.

In step S200, the control unit 34 acquires the local map received by the transmission and reception unit 32 and outputs the local map to the correction unit 36.

In step S202, the correction unit 36 reidentifies the location of the vehicle from the key frame image included in the local map output in step S200.

In step S204, the correction unit 36 corrects the location and posture of the vehicle in the local map based on the local map output in step S200 and the location of the vehicle reidentified in step S202.

In step S206, the correction unit 36 corrects the map point of each key frame of the local map according to the correction of the location and posture of the vehicle in each key frame of the local map in step S204.

In step S208, the update unit 38 updates a part corresponding to the local map of the overall map stored in the overall map storage unit 31 based on the local map corrected in step S204 and step S206 described above.

As described above, in the data management system according to the present embodiment, the in-vehicle device generates the local map based on each of the estimated locations of the vehicle and each of the peripheral images determined as the key frame image. The data management device updates the overall map based on the local map transmitted from the in-vehicle device. Thereby, the overall map is updated by using the sequentially generated local map, and there is no desire to hold a map corresponding to a parking state, and thus, it is possible to reduce the amount of maps representing a target region.

It is possible to reduce the number of maps held in the data management device and to cope with various dynamic environments. Cumulative errors of the local map and a scale drift can be suppressed by correcting the local map of the data management device.

Second Embodiment

Next, a second embodiment will be described. The second embodiment is different from the first embodiment in that a location of a vehicle of each key frame of a local map is reidentified at each predetermined interval in a travel locus representing a time series of the location of the vehicle.

Figure 14:
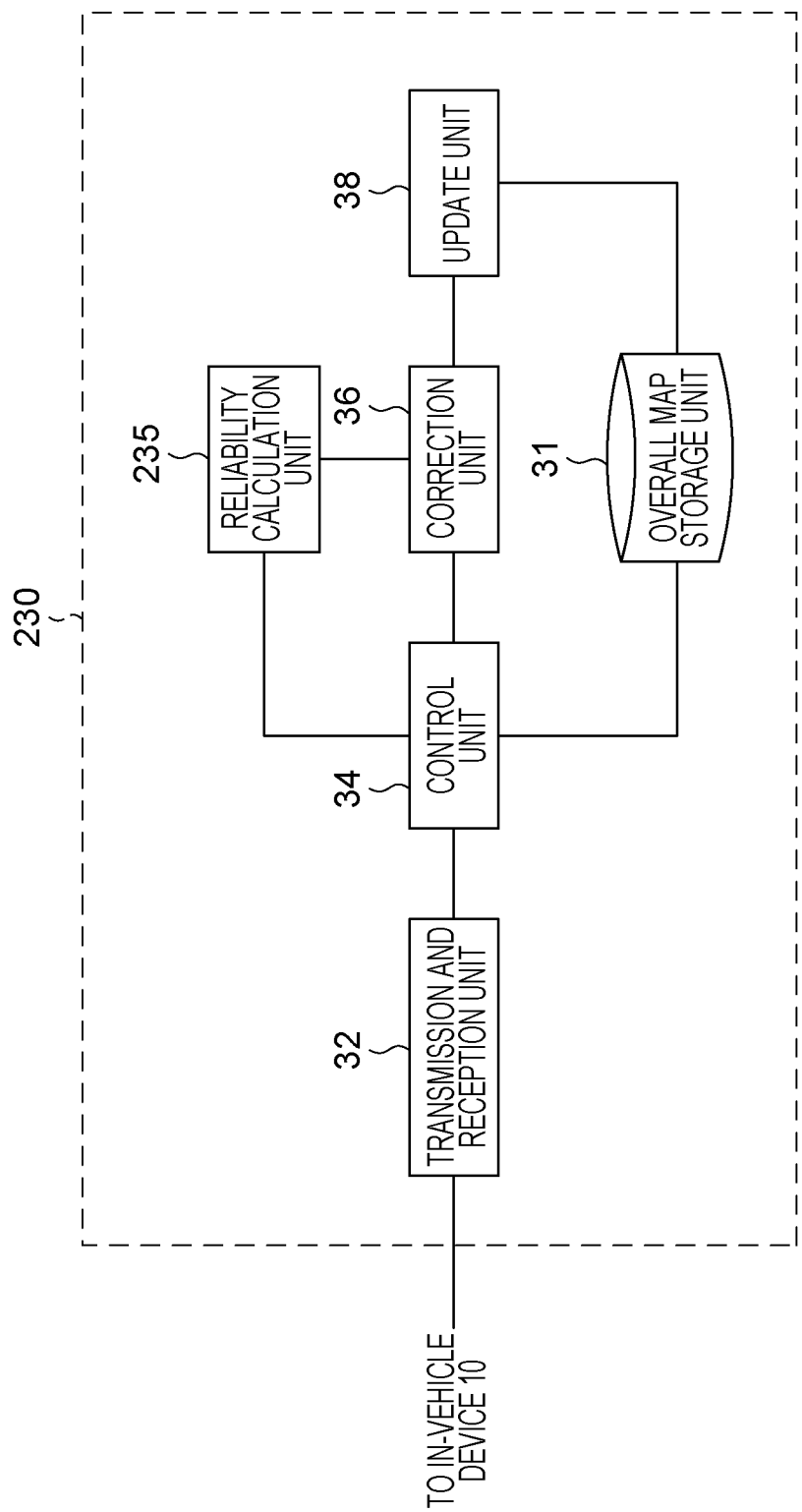
FIG. 14 is a schematic block diagram of a data management device according to a second embodiment.

FIG. 14 illustrates a configuration example of a data management device 230 according to the second embodiment. As illustrated in FIG. 14, the data management device 230 according to the second embodiment includes the overall map storage unit 31, the transmission and reception unit 32, the control unit 34, the correction unit 36, the update unit 38, and a reliability calculation unit 235.

The reliability calculation unit 235 reidentifies each location of a vehicle represented in the local map according to a location of the vehicle when a key frame image of a local map transmitted from the in-vehicle device 10 is captured. The reliability calculation unit 235 calculates a reliability relating to the local map based on each of the reidentified locations of the vehicle.

For example, the reliability calculation unit 235 reidentifies the location of the vehicle of the local map transmitted from the in-vehicle device 10 at regular intervals. A reidentification method can use the relocalization algorithm described in Reference Document 2 in the same manner as in the correction unit 36 according to the first embodiment. For example, the location is identified for each of four key frame as the relocalization interval of the location of the vehicle.

Next, the reliability calculation unit 235 calculates the reliability of the local map and determines whether or not the location of each key frame is corrected. For example, the reliability calculation unit 235 calculates a location of each reidentified key frame and a distance between each of the original key frames of the local map.

The correction unit 36 corrects the local map if an average distance of each key frame as an example of the reliability relating to the local map calculated by the reliability calculation unit 235 is less than or equal to a threshold (for example, 0.3 m). The update unit 38 updates the overall map using the corrected local map.

If the average distance of each key frame calculated by the reliability calculation unit 235 is larger than the threshold (for example, 0.3 m), the correction unit 36 does not update the overall map. If the location of the vehicle of the key frame of the local map transmitted from the in-vehicle device 10 is too different from the location of the vehicle of the key frame re-identified by the reliability calculation unit 235, it is highly possible that the local map does not represent the real world.

Figure 15:
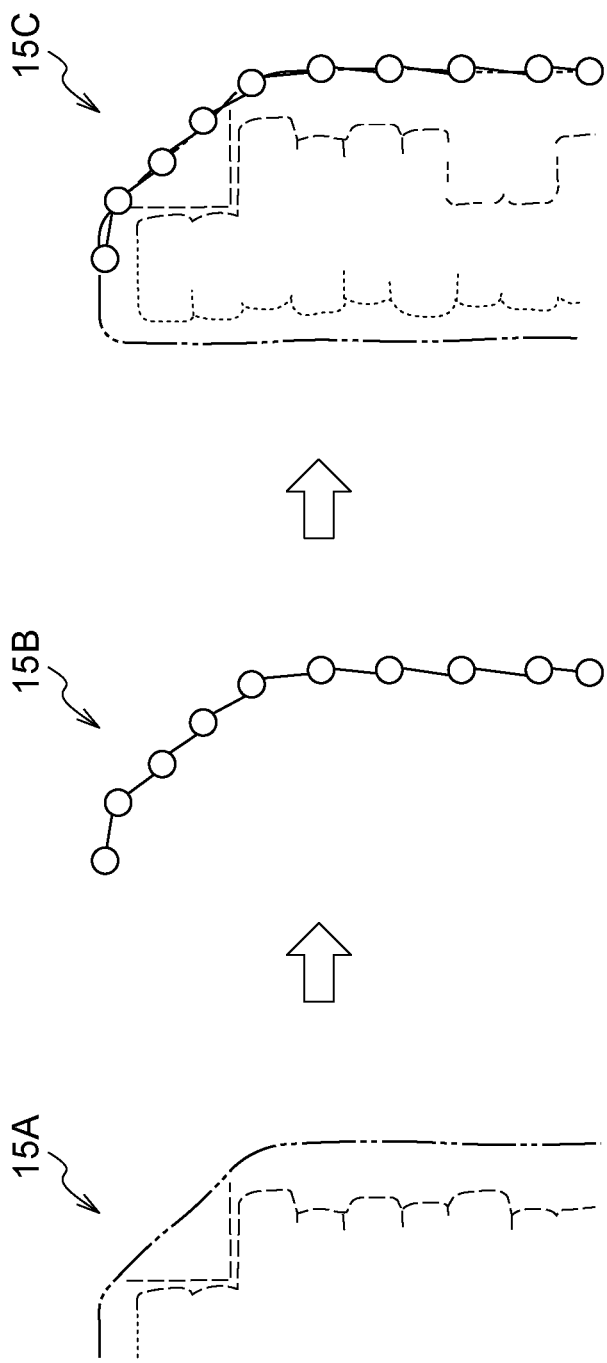
FIG. 15 is an explanatory diagram illustrating processing in which a location of a vehicle of the key frame of the local map is reidentified at each prescribed interval.

FIG. 15 is an explanatory diagram illustrating locations of the vehicles re-identified at each predetermined interval. For example, if the local map 15A is transmitted from the in-vehicle device 10, the reliability calculation unit 235 re-identifies the locations of the vehicle in the key frame of the local map at regular intervals and obtains the re-identification result 15B. Then, the reliability calculation unit 235 calculates a reliability based on the location of each key frame in the local map 15A and the re-identification result 15B. If the reliability is equal to or greater than the threshold, the correction unit 36 corrects the local map by using the re-identification result 15B. For example, the correction unit 36 corrects the local map by gradually optimizing a graph such that first a location becomes an initially re-identified location and then the first re-identified location, and next the location becomes the first re-identified location and a second re-identified location. The update unit 38 updates the overall map by using the corrected local map to obtain the overall map 15C.

The data management device 230 may be realized by the computer 80 illustrated in FIG. 11. A data management program 290 for causing the computer 80 to function as the data management device 230 is stored in the storage unit 83 of the computer 80. The data management program 290 includes the transmission and reception process 92, the control process 93, the correction process 94, the update process 95, and a reliability calculation process 296. The storage unit 83 includes the overall map storage region 96 where information for configuring the overall map storage unit 31 is stored.

The CPU 81 reads the data management program 290 from the storage unit 83 to develop in the memory 82 and sequentially executes the processes included in the data management program 290. By executing the transmission and reception process 92, the CPU 81 operates as the transmission and reception unit 32 illustrated in FIG. 14. By executing the control process 93, the CPU 81 operates as the control unit 34 illustrated in FIG. 14. By executing the correction process 94, the CPU 81 operates as the correction unit 36 illustrated in FIG. 14. By executing the update process 95, the CPU 81 operates as the update unit 38 illustrated in FIG. 14. By executing the reliability calculation process 296, the CPU 81 operates as the reliability calculation unit 235 illustrated in FIG. 14. The CPU 81 reads information from the overall map storage region 96 and develops the overall map storage unit 31 in the memory 82. Thereby, the computer 80 that executes the data management program 290 functions as the data management device 230. Accordingly, a processor that executes the data management program 290 which is software is hardware.

The function realized by the data management program 290 can also be realized by, for example, a semiconductor integrated circuit, more specifically, an ASIC or the like.

Figure 16:
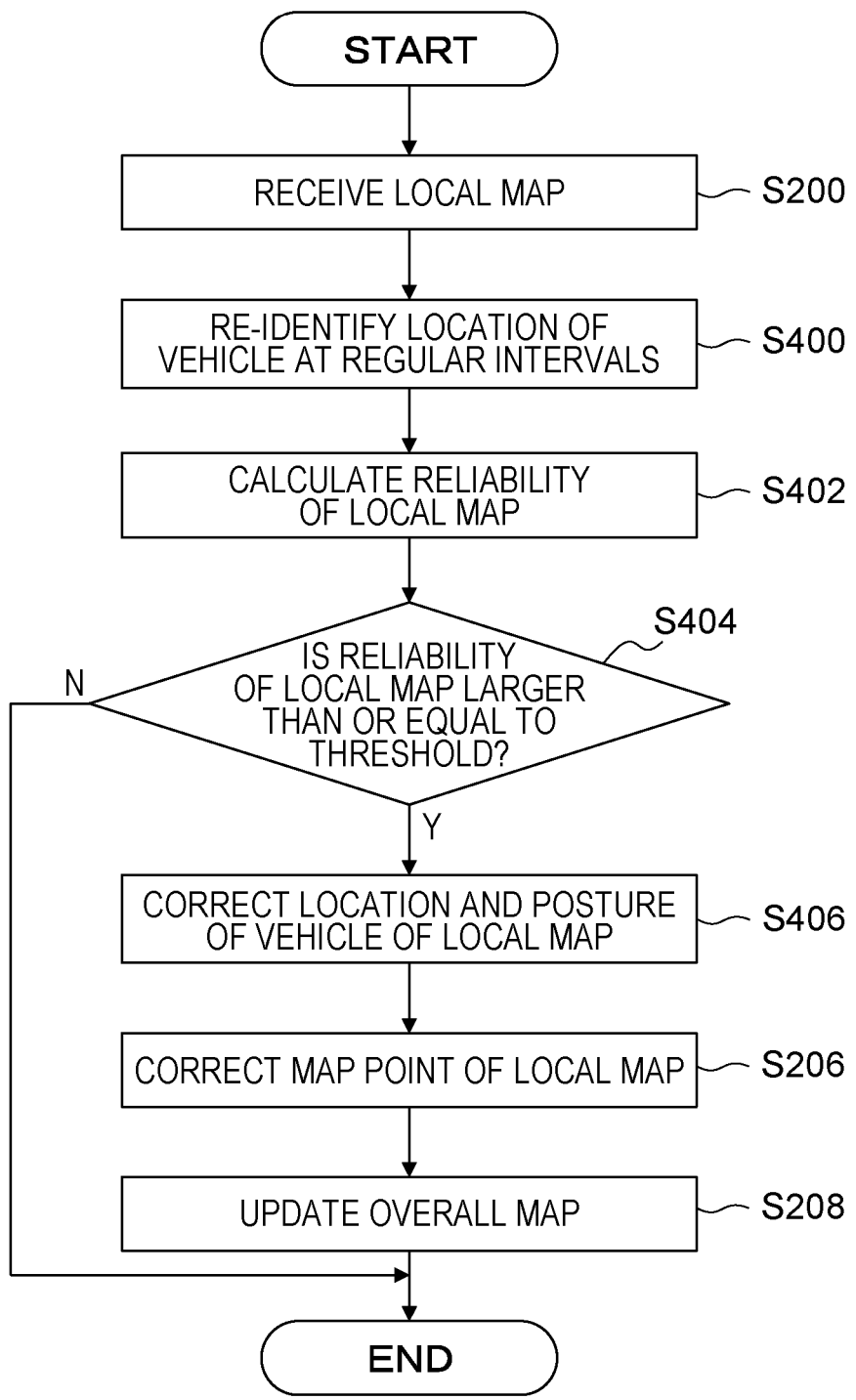
FIG. 16 is a flowchart illustrating an example of data management processing according to the second embodiment.

Next, an operation of the data management device 230 according to the second embodiment will be described. If the transmission and reception unit 32 receives the local map transmitted from the in-vehicle device 10, the data management device 230 executes the data management processing illustrated in FIG. 16.

Steps S200 and S206 to S208 are executed in the same manner as in the first embodiment.

In step S400, the reliability calculation unit 235 reidentifies each location of the vehicle represented by each key frame of the local map according to the location of the vehicle when the key frame image of the local map acquired in step S200 is captured.

In a step S402, the reliability calculation unit 235 calculates an average distance between the location of each key frame reidentified in step S400 described above and each original key frame in the local map acquired in step S200 described above and sets the calculated distance as a reliability of the local map.

Next, in step S404, the correction unit 36 determines whether or not the reliability of the local map calculated in step S402 described above is larger than a threshold. If the reliability of the local map is larger than the threshold, the processing proceeds to step S406. Meanwhile, if the reliability of the local map is equal to or less than the threshold, the processing ends.

In step S406, the correction unit 36 corrects the location and posture of the vehicle in the local map based on the local map output in step S200 and each location of the vehicle reidentified in step S400.

As described above, in the second embodiment, the data management device 230 reidentifies each location of the vehicle represented by the local map and calculates the reliability relating to the local map based on each of the reidentified locations of the vehicle. The data management device 230 updates the overall map by using the local map according to the reliability. Thereby, the overall map may be accurately updated by using the reliability of the local map. For example, since a plurality of re-identified results are used, a correction accuracy is increased. If the reliability of the local map is less than the threshold, the local map may be rejected.

Third Embodiment

Next, a third embodiment will be described. The third embodiment is different from the first and second embodiments in that the map point corresponding to a host vehicle is reflected in the overall map.

For example, if a vehicle is parked in a parking lot, the vehicle that generates a local map is parked in any parking space of the parking lot. However, presence of the vehicle parked in the parking space is not reflected in the local map generated by the vehicle. In the third embodiment, a map point corresponding to the host vehicle that generates the local map is reflected in the overall map.

Figure 17:
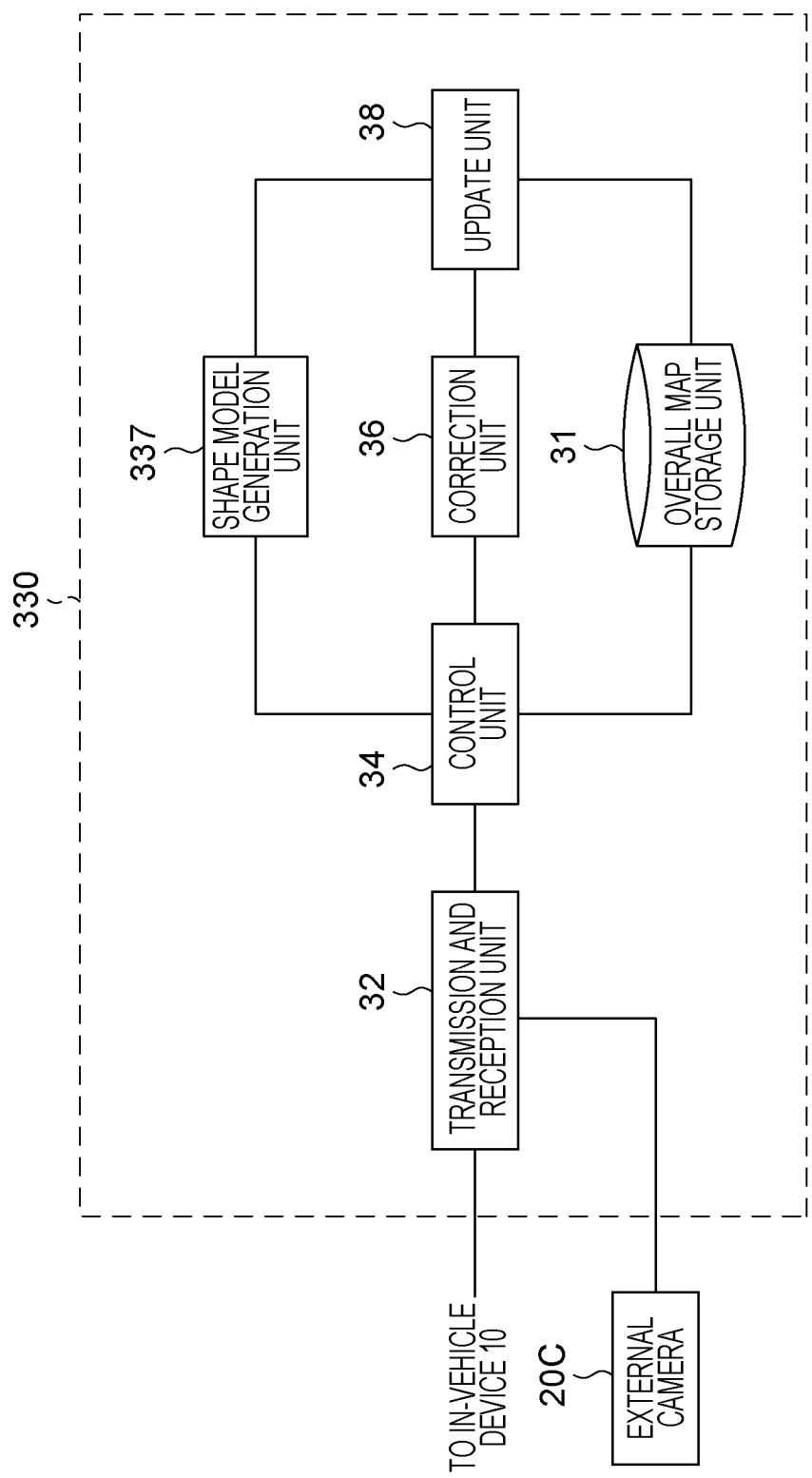
FIG. 17 is a schematic block diagram of a data management device according to a third embodiment.

FIG. 17 illustrates a configuration example of a data management device 330 according to the third embodiment. The data management device 330 according to the third embodiment includes the overall map storage unit 31, the transmission and reception unit 32, the control unit 34, the correction unit 36, the update unit 38, and a shape model generation unit 337 as illustrated in FIG. 17. The data management device 330 acquires an image of the host vehicle that generates the local map from an external camera 20C.

The external camera 20C captures an image of the host vehicle that generates the local map.

Figure 18:
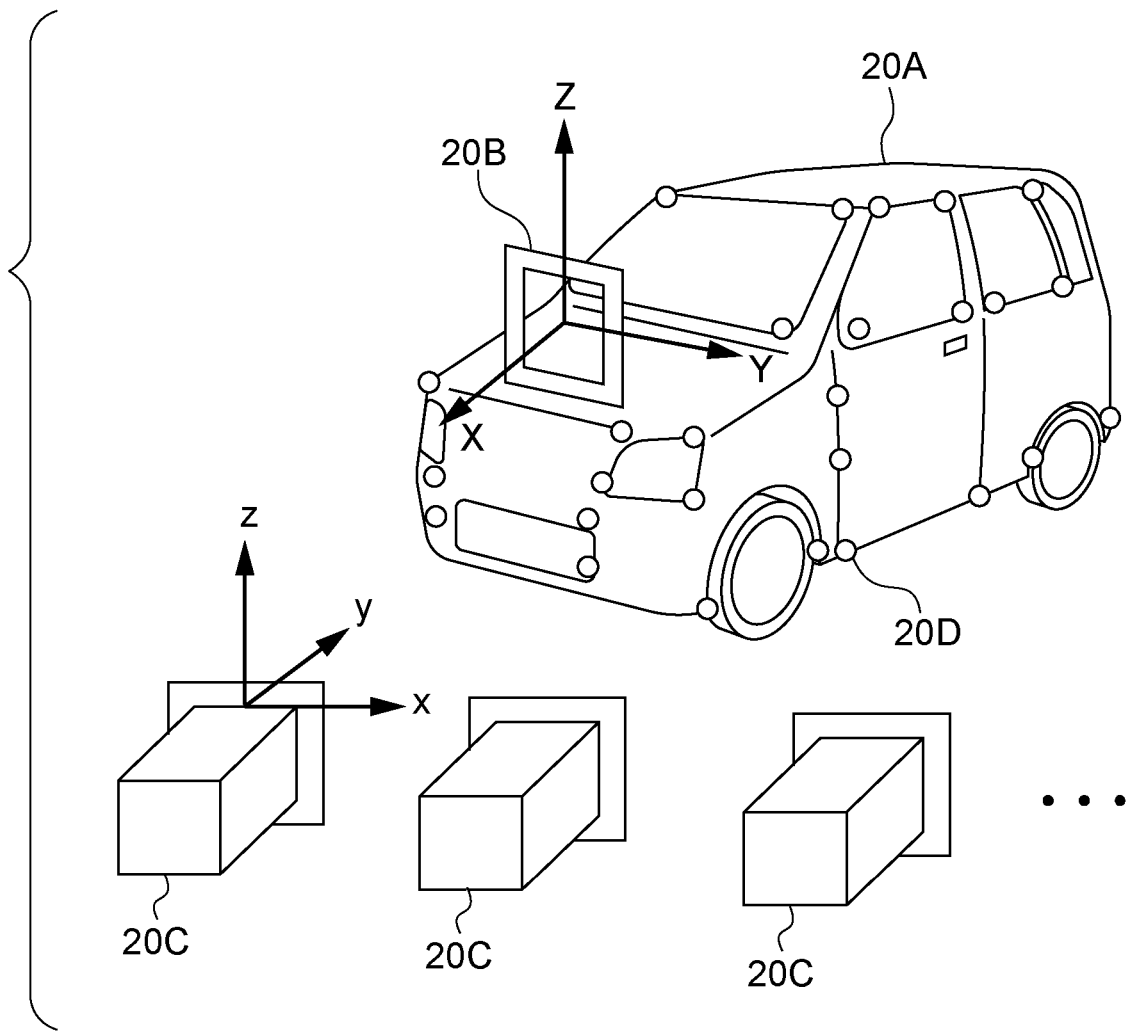
FIG. 18 is an explanatory diagram illustrating a shape model according to the third embodiment.

FIG. 18 is an explanatory diagram illustrating the third embodiment. The example of FIG. 18 illustrates a state where a host vehicle 20A is parked in a parking space. The external camera 20C is provided around the host vehicle 20A to capture an image of the host vehicle 20A. A marker 20B having a known shape and a known angle of attachment to the camera is attached to the camera of the host vehicle 20A. The external camera 20C captures images of two or more viewpoints from the outside of the host vehicle 20A such that the marker 20B is imaged. The external camera 20C transmits the images of the host vehicle 20A to the data management device 330.

The transmission and reception unit 32 of the data management device 330 receives the images of the host vehicle transmitted from the external camera 20C. The control unit 34 outputs the images of the host vehicle received by the transmission and reception unit 32 to the shape model generation unit 337.

The shape model generation unit 337 generates a shape model representing three-dimensional coordinates of each point on the host vehicle, based on the images of the vehicle output from the control unit 34. For example, the shape model generation unit 337 acquires the three-dimensional coordinates of each point on the host vehicle by setting the viewpoint of the external camera 20C as an original point according to a method described in Reference Document 5. The shape model generation unit 337 acquires a posture of the marker appearing in the image of the vehicle captured by the external camera 20C according to a method described in Reference Document 6. For example, the shape model generation unit 337 estimates coordinates of four corners of the marker in the image by binarizing or labeling and estimates a rotational component and a translational component of the marker, thereby acquiring the posture of the marker. An internal parameter of the external camera 20C is acquired in advance by a calibration described in Reference Document 4 described above.

Reference Document 6: H. Kato et al., "Marker tracking and HMD calibration for a video-based augmented reality conferencing system", In Proc. of IEEE and ACM International Workshop on Augmented Reality (IWAR), pp. 85-94, 1999.

The shape model generation unit 337 converts the three-dimensional coordinates of each point on the host vehicle such that the viewpoint of the external camera 20C is not set as the original point but the marker is set as the original point. For example, the shape model generation unit 337 converts a coordinate system of the external camera 20C into a coordinate system of the camera 12 based on the posture of the marker appearing in the image captured by the external camera 20C. Thereby, a shape model representing the three-dimensional coordinates of each point on the vehicle in which the camera 12 of the host vehicle is set as the original point is obtained. In the example illustrated in FIG. 18, 20D represents each point on the vehicle.

The update unit 38 updates the overall map stored in the overall map storage unit 31 based on the location of the host vehicle obtained from the local map and the shape model generated by the shape model generation unit 337.

For example, the update unit 38 allocates the shape model generated by the shape model generation unit 337 to the overall map by using the location and posture of the host vehicle at the time of parking which is previously obtained based on reidentification of the location of the host vehicle obtained by the correction unit 36.

The data management device 330 can be realized by a computer 80 illustrated in FIG. 11. A data management program 390 that causes the computer 80 to function as the data management device 330 is stored in the storage unit 83 of the computer 80. The data management program 390 includes the transmission and reception process 92, the control process 93, the correction process 94, the update process 95, and a shape model generation process 397. The storage unit 83 includes the overall map storage region 96 that stores information for configuring the overall map storage unit 31.

The CPU 81 reads the data management program 390 from the storage unit 83 to develop in the memory 82 and sequentially executes processes included in the data management program 390. By executing the transmission and reception process 92, the CPU 81 operates as the transmission and reception unit 32 illustrated in FIG. 17. By executing the control process 93, the CPU 81 operates as the control unit 34 illustrated in FIG. 17. By executing the correction process 94, the CPU 81 operates as the correction unit 36 illustrated in FIG. 17. By executing the update process 95, the CPU 81 operates as the update unit 38 illustrated in FIG. 17. By executing the shape model generation process 397, the CPU 81 operates as the shape model generation unit 337 illustrated in FIG. 17. The CPU 81 reads information from the overall map storage region 96 and develops the overall map storage unit 31 in the memory 82. Thereby, the computer 80 that executes the data management program 390 functions as the data management device 330. Accordingly, a processor that executes the data management program 390 which is software is hardware.

The function realized by the data management program 390 can be realized by, for example, a semiconductor integrated circuit, more specifically, an ASIC or the like.

Figure 19:
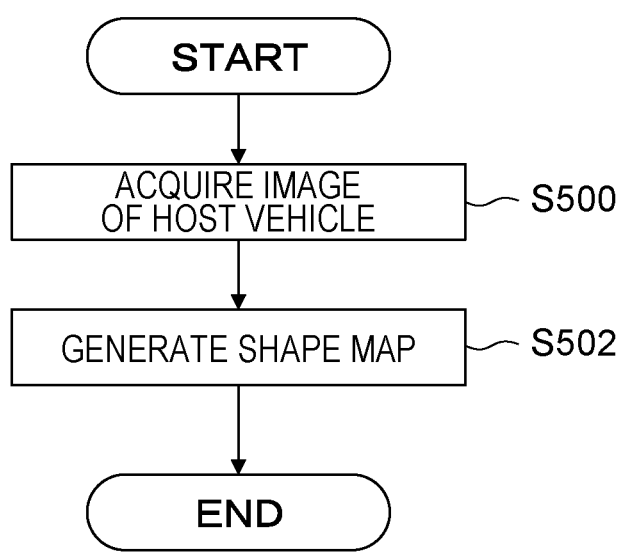
FIG. 19 is a flowchart illustrating an example of shape model generation processing according to the third embodiment.

Next, an operation of the data management device 330 according to the third embodiment will be described. If the transmission and reception unit 32 receives the image of the host vehicle transmitted from the external camera 20C, the data management device 330 executes shape model generation processing illustrated in FIG. 19.

First, in step S500, the shape model generation unit 337 acquires an image of a host vehicle output from the control unit 334.

In step S502, the shape model generation unit 337 generates a shape model based on the image of the host vehicle acquired in step S500.

Figure 20:
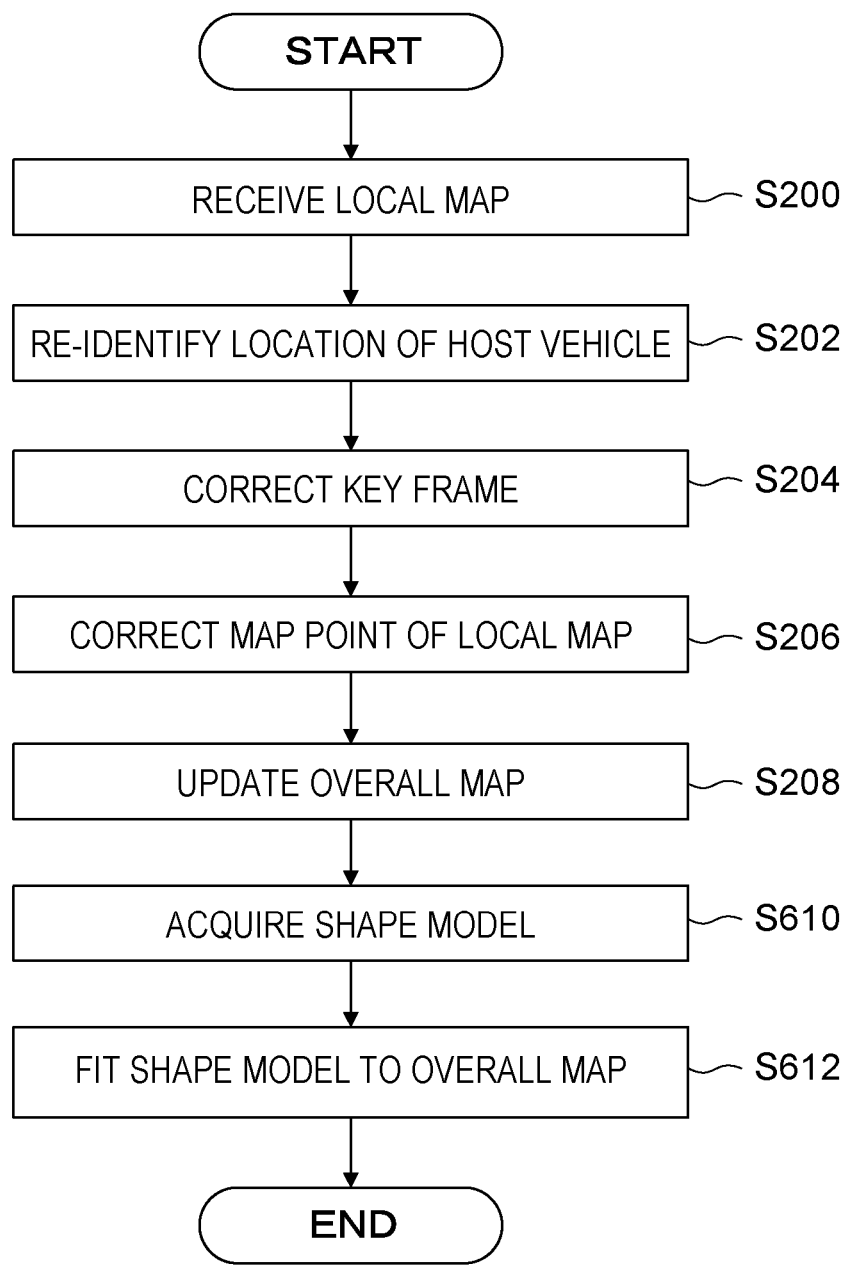
FIG. 20 is a flowchart illustrating an example of data management processing according to the third embodiment.

Next, if the transmission and reception unit 32 receives a local map transmitted from the in-vehicle device 10, the data management device 330 executes data management processing illustrated in FIG. 20.

Each processing of step S200 to step S208 is executed in the same manner as in the first embodiment.

In step S610, the update unit 38 acquires the shape model generated by the shape model generation processing.

In step S612, the update unit 38 updates the overall map stored in the overall map storage unit 31 based on a location of the host vehicle corrected in step S206 and the shape model acquired in step S610 and the data management processing ends.

As described above, in the third embodiment, a shape model representing three-dimensional coordinates of each point on the host vehicle is generated, and the overall map is updated based on the shape model. Thereby, a map point indicating the three-dimensional coordinates of each point on the host vehicle that generates the local map can be reflected in the overall map. Accordingly, the overall map including the map point of the host vehicle may be accurately updated.

Fourth Embodiment

A fourth embodiment will be described. The fourth embodiment is different from the first to third embodiments in that an in-vehicle device updates an overall map.

Figure 21:
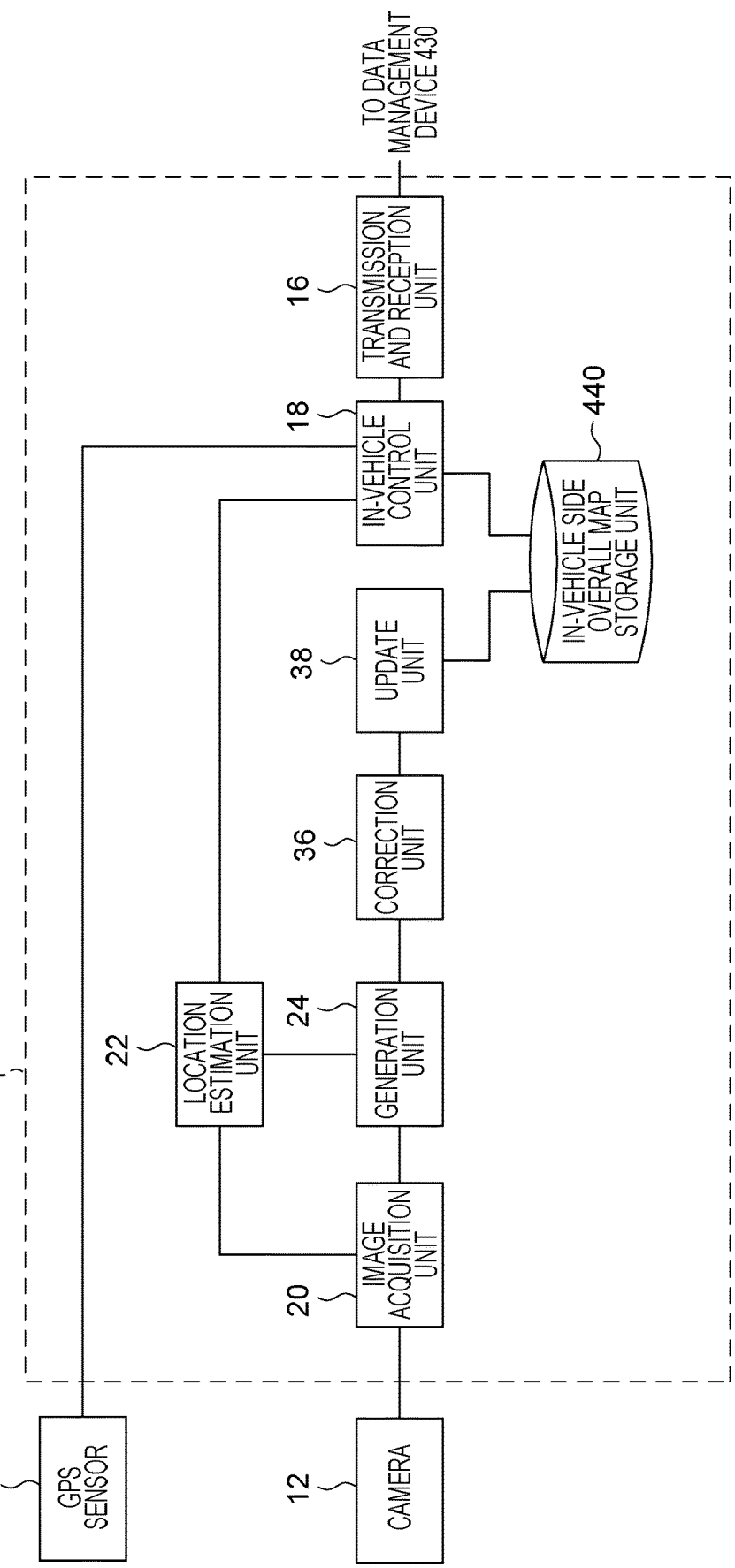
FIG. 21 is a schematic block diagram of an in-vehicle device according to a fourth embodiment.

An in-vehicle device 410 illustrated in FIG. 21 includes the camera 12, the GPS sensor 13, and a control unit 414. The in-vehicle device 410 generates a local map around a vehicle based on a peripheral image of the vehicle captured by the camera 12 and updates an overall map transmitted from a data management device 430 which will be described below. As illustrated in FIG. 21, the control unit 414 includes the transmission and reception unit 16, the in-vehicle control unit 18, the image acquisition unit 20, the location estimation unit 22, the generation unit 24, the correction unit 36, the update unit 38, and an in-vehicle side overall map storage unit 440.

Figure 22:
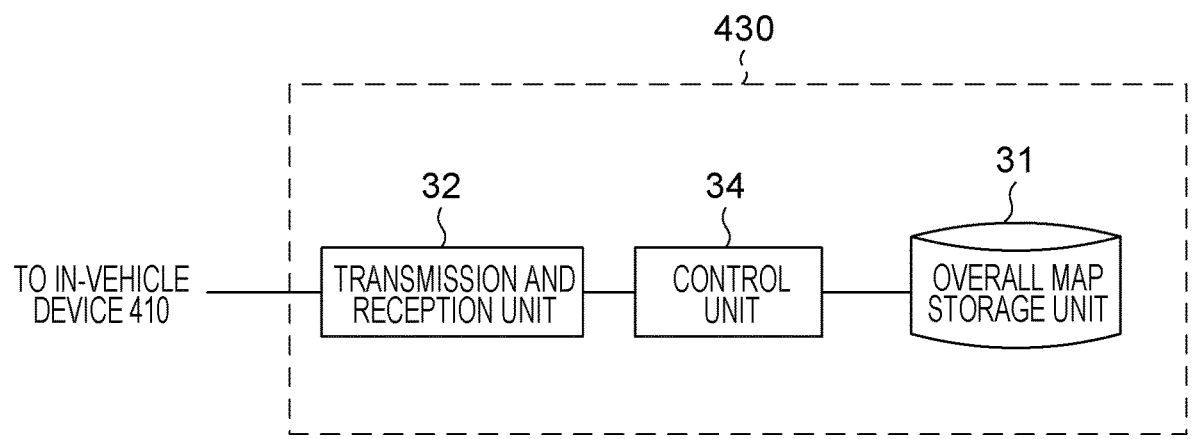
FIG. 22 is a schematic block diagram of a data management device according to the fourth embodiment.

The data management device 430 illustrated in FIG. 22 includes then overall map storage unit 31, the transmission and reception unit 32, and the control unit 34. The data management device 430 stores the overall map transmitted from the in-vehicle device 410 in the overall map storage unit 31.

Hereinafter, specific processing of the in-vehicle device 410 and the data management device 430 will be described.

The in-vehicle control unit 18 of the in-vehicle device 410 stores the overall map received by the transmission and reception unit 16 in the in-vehicle side overall map storage unit 440. The in-vehicle control unit 18 outputs the overall map received by the transmission and reception unit 16 to the location estimation unit 22.

The correction unit 36 corrects a local map generated by the generation unit 24 in the same manner as the correction unit 36 of the data management device 30 according to the first embodiment.

The update unit 38 reads the overall map stored in the in-vehicle side overall map storage unit 440 and updates the overall map based on the local map corrected by the correction unit 36 in the same manner as the update unit 38 of the data management device 30 according to the first embodiment.

If the overall map updated by the update unit 38 is stored in the in-vehicle side overall map storage unit 440, the in-vehicle control unit 18 transmits the overall map stored in the in-vehicle side overall map storage unit 440 to the data management device 430 via the transmission and reception unit 16.

The transmission and reception unit 32 of a data management device 430 illustrated in FIG. 22 receives the overall map transmitted from an in-vehicle device 410. The control unit 34 stores the overall map received by the transmission and reception unit 32 in the overall map storage unit 31.

Figure 23:
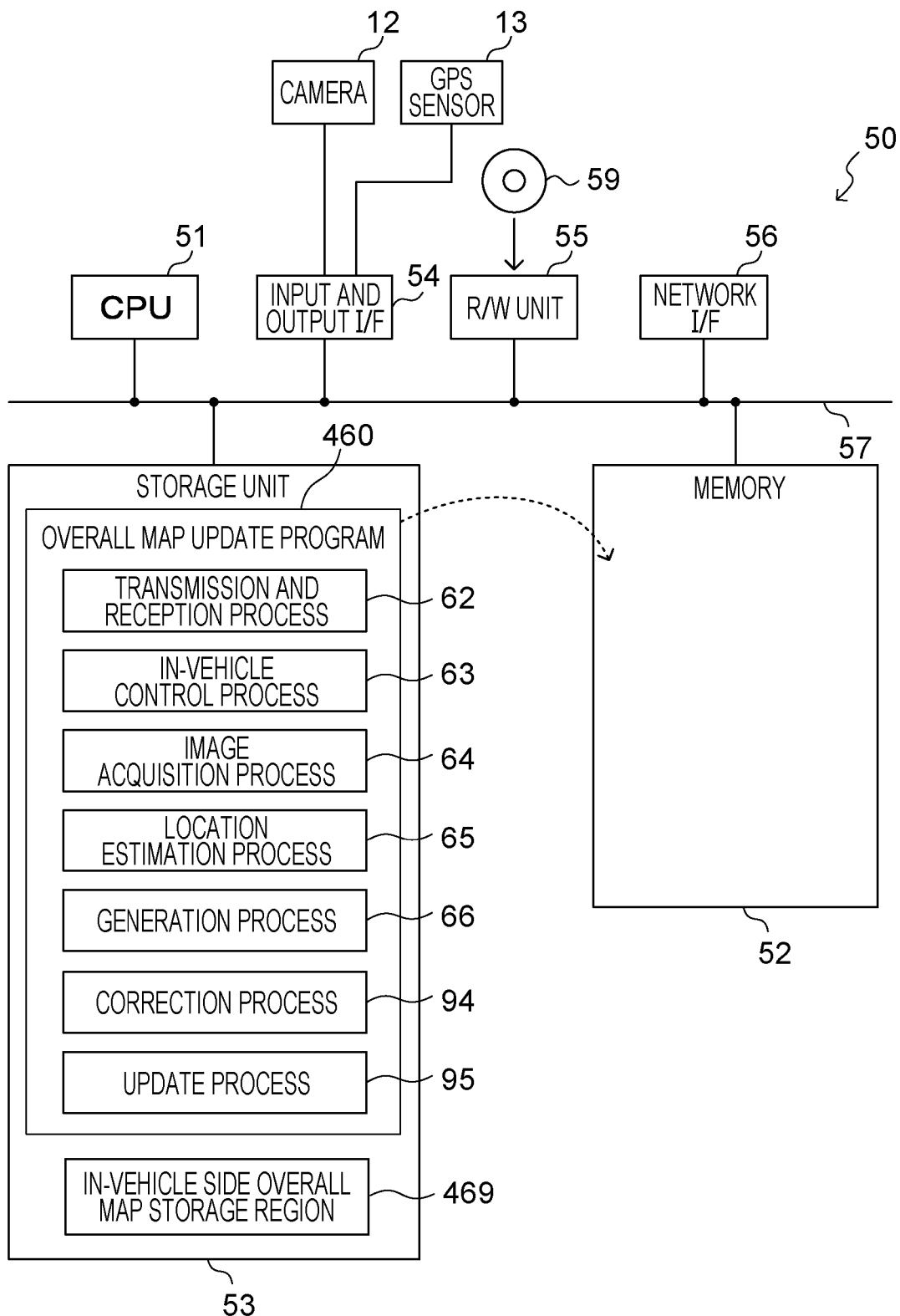
FIG. 23 is a block diagram illustrating a schematic configuration of a computer functioning as a control unit of the in-vehicle device relating to the fourth embodiment.

The control unit 414 of the in-vehicle device 410 can be realized by, for example, a computer 50 illustrated in FIG. 23. The storage unit 53 of the computer 50 stores an overall map update program 460 for causing the computer 50 to function as the control unit 414 of the in-vehicle device 410. The overall map update program 460 includes the transmission and reception process 62, the in-vehicle control process 63, the image acquisition process 64, the location estimation process 65, the generation process 66, the correction process 94, and the update process 95. The storage unit 53 has an in-vehicle side overall map storage region 469 in which information for configuring the in-vehicle side overall map storage unit 440 is stored.

The CPU 51 reads out the overall map update program 460 from the storage unit 53 to develop in the memory 52 and sequentially executes processes of the overall map update program 460. By executing the transmission and reception process 62, the CPU 51 operates as the transmission and reception unit 16 illustrated in FIG. 21. By executing the in-vehicle control process 63, the CPU 51 operates as the in-vehicle control unit 18 illustrated in FIG. 21. By executing the image acquisition process 64, the CPU 51 operates as the image acquisition unit 20 illustrated in FIG. 21. By executing the location estimation process 65, the CPU 51 operates as the location estimation unit 22 illustrated in FIG. 21. By executing the generation process 66, the CPU 51 operates as the generation unit 24 illustrated in FIG. 21. By executing the correction process 94, the CPU 51 operates as the correction unit 36 illustrated in FIG. 21. By executing the update process 95, the CPU 51 operates as the update unit 38 illustrated in FIG. 21. Thereby, the computer 50 that executes the overall map update program 460 can function as the control unit 414 of the in-vehicle device 410. Accordingly, a processor that executes the overall map update program 460 which is software is hardware.

The function realized by the overall map update program 460 can be realized by, for example, a semiconductor integrated circuit, more specifically, an ASIC or the like.

Figure 24:
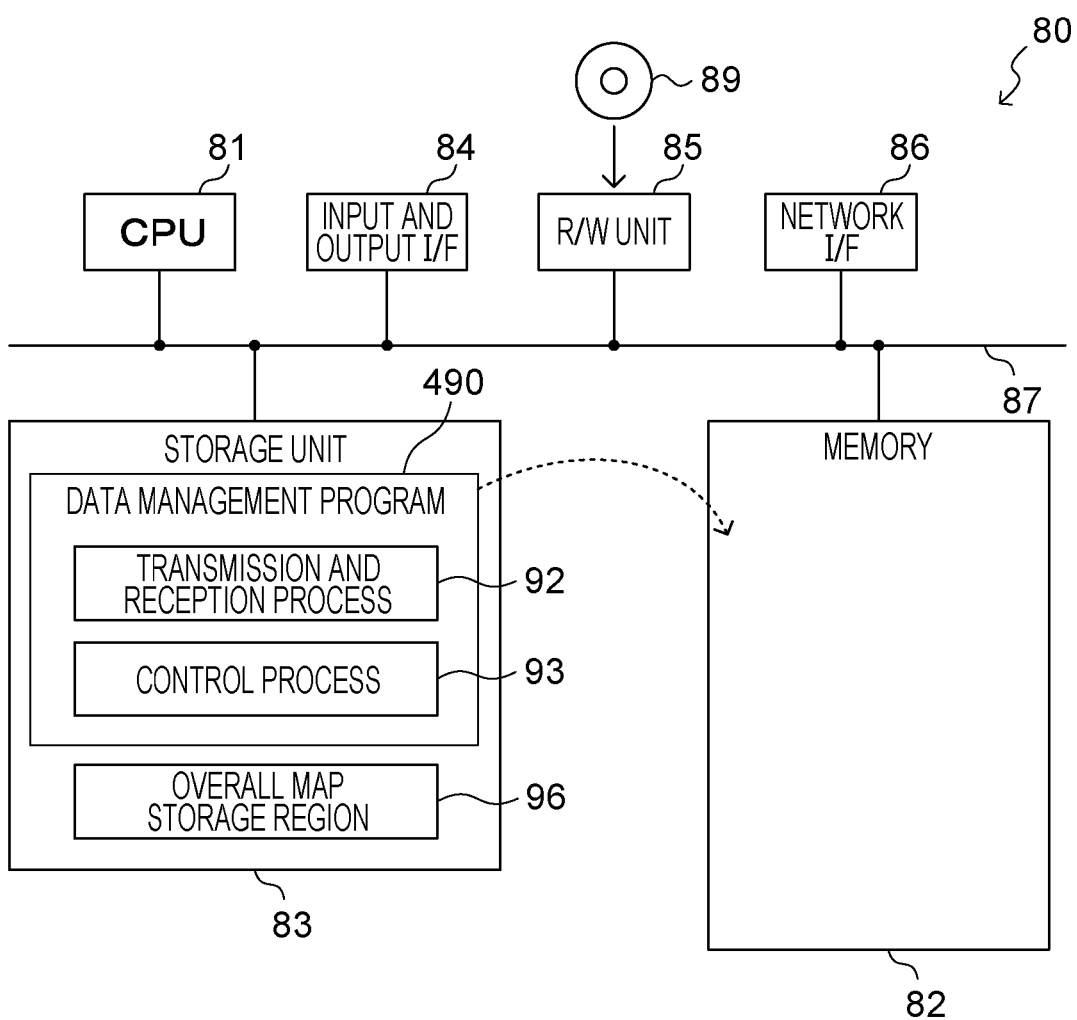
FIG. 24 is a block diagram illustrating the schematic configuration of the computer functioning as a data management device according to the fourth embodiment.

The data management device 430 can be realized by a computer 80 illustrated in FIG. 24. A data management program 490 for causing the computer 80 to function as the data management device 430 is stored in the storage unit 83 of the computer 80. The data management program 490 includes the transmission and reception process 92 and the control process 93. The storage unit 83 has an overall map storage region 96 that stores information for configuring the overall map storage unit 31.

The CPU 51 reads the data management program 490 from the storage unit 83 to develop in the memory 82 and sequentially executes processes of the data management program 490. By executing the transmission and reception process 92, the CPU 81 operates as the transmission and reception unit 32 illustrated in FIG. 22. By executing the control process 93, the CPU 81 operates as the control unit 34 illustrated in FIG. 22. The CPU 81 reads information from the overall map storage region 96 and develops the overall map storage unit 31 in the memory 82. Thereby, the computer 80 that executes the overall map update program 460 functions as the data management device 430. Accordingly, a processor that executes the data management program 490 which is software is hardware.

The function realized by the data management program 490 can be realized by, for example, a semiconductor integrated circuit, more specifically, an ASIC or the like.

Next, an operation of a data management system according to the fourth embodiment will be described. The transmission and reception unit 32 of the data management device 430 transmits the overall map stored in the overall map storage unit 31 to the in-vehicle device 410 via the transmission and reception unit 32, according to the control signal transmitted from the in-vehicle device 410. If the overall map transmitted from the data management device 430 is received, the transmission and reception unit 16 of the in-vehicle device 410 stores the overall map in the in-vehicle side overall map storage unit 440. Then, the control unit 14 of the in-vehicle device 410 executes the overall map update processing illustrated in FIG. 25. Hereinafter, each processing will be described in detail.

Figure 25:
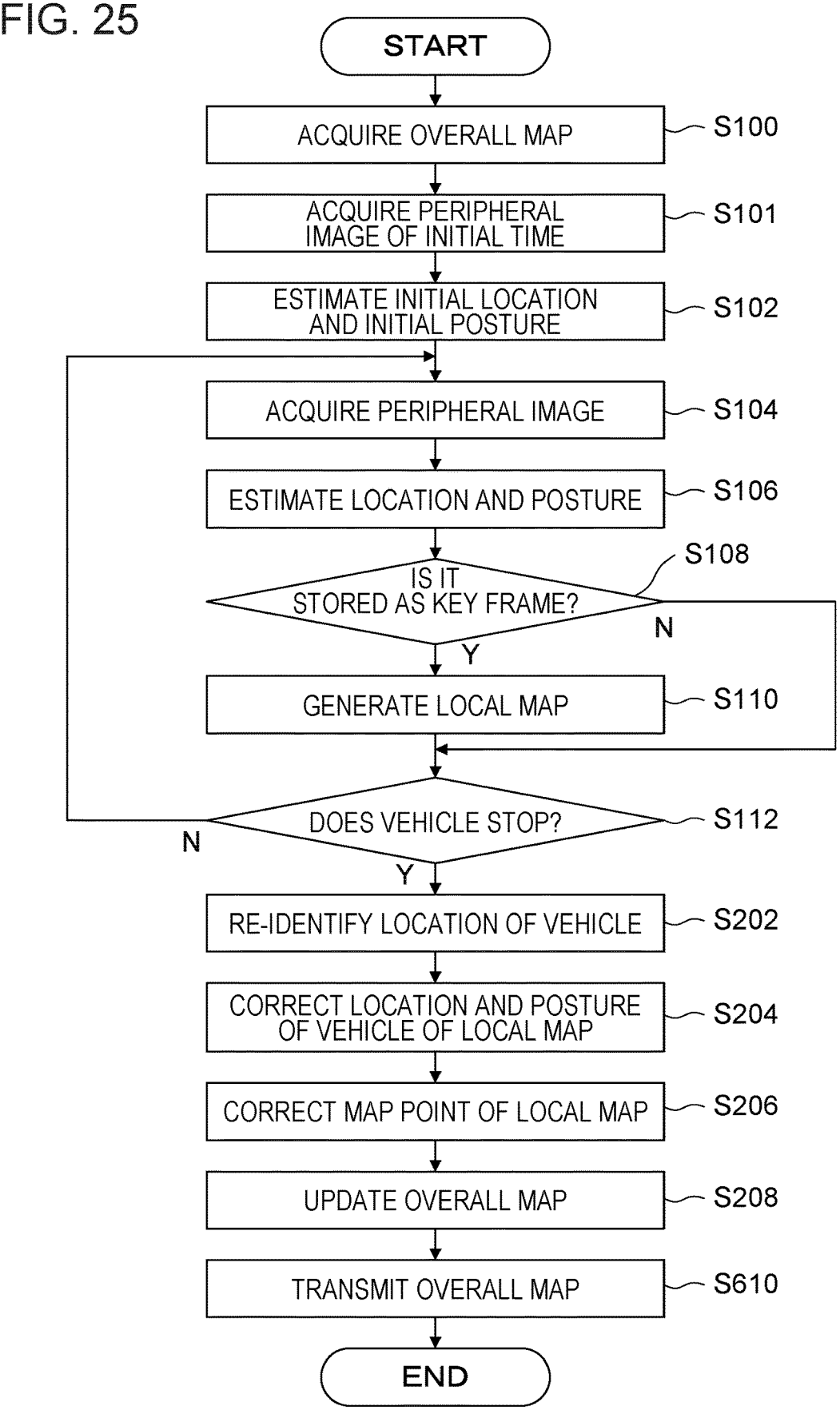
FIG. 25 is a flowchart illustrating an example of overall map update processing according to the fourth embodiment.

Each processing of step S100 to step S112 and step S202 to step S208 in the overall map update processing illustrated in FIG. 25 is executed in the same manner as in the first embodiment.

In step S610, the in-vehicle control unit 18 transmits the overall map stored in the in-vehicle side overall map storage unit 440 to the data management device 430 via the transmission and reception unit 16 and ends the overall map update processing.

Figure 26:
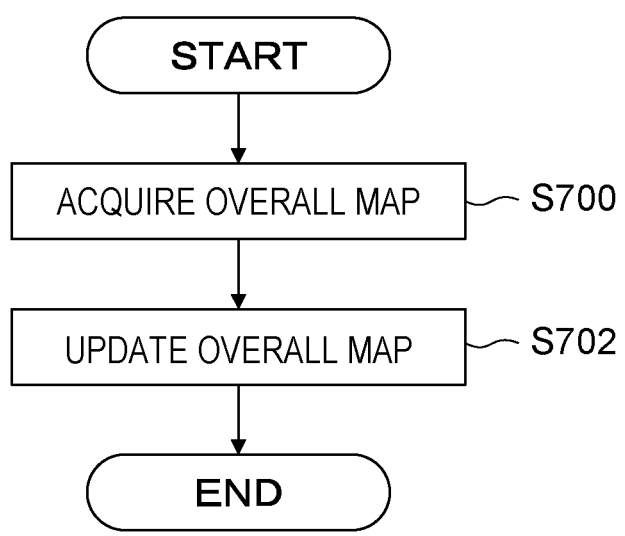
FIG. 26 is a flowchart illustrating an example of data management processing according to the fourth embodiment.

If the transmission and reception unit 32 of the data management device 430 receives the overall map transmitted from the in-vehicle device 410, the data management device 430 executes data management processing illustrated in FIG. 26.

In step S700, the control unit 34 acquires the overall map received by the transmission and reception unit 32.

In step S702, the control unit 34 stores the overall map acquired in step S700 described above in the overall map storage unit 31.

The in-vehicle device generates the local map based on each of the estimated locations of the vehicle and each of the peripheral images determined as the key frame image. Then, the in-vehicle device updates the overall map based on the local map. Then, the in-vehicle device transmits the overall map to the data management device. Thereby, for example, if the local map is not able to be transmitted, it is possible to update the overall map by using the local map in advance and to generate the overall map depending on a parking state. If the local map can be transmitted, it is possible to transmit the updated overall map to the data management device, and to update the overall map.

Fifth Embodiment

Next, a fifth embodiment will be described. The fifth embodiment is different from the first to fourth embodiments in that a data management device 530 generates a local map and an overall map is updated based on the generated local map.

Figure 27:
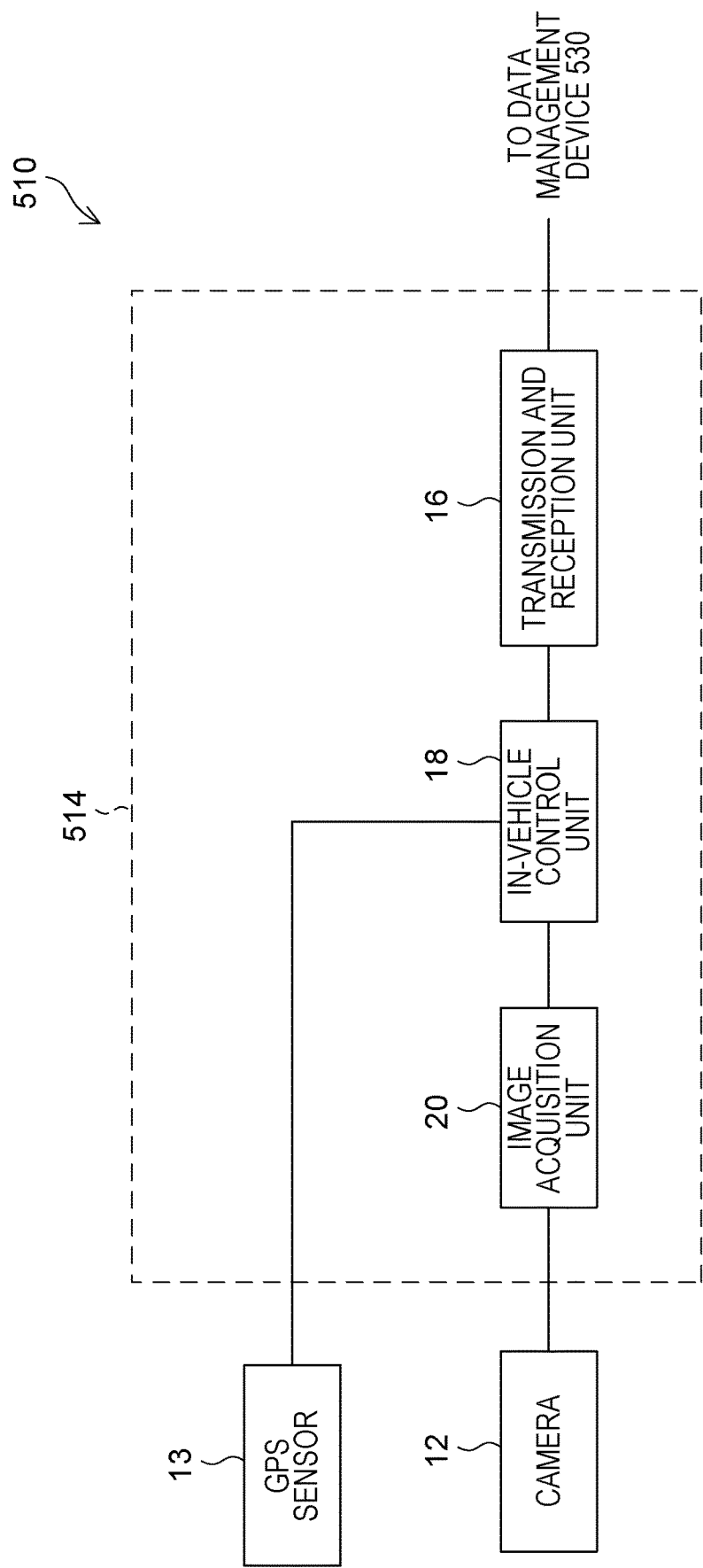
FIG. 27 is a schematic block diagram of an in-vehicle device according to a fifth embodiment.

An in-vehicle device 510 illustrated in FIG. 27 includes the camera 12, the GPS sensor 13 and a control unit 514. The in-vehicle device 510 sequentially transmits peripheral images of a vehicle captured by the camera 12 to the data management device 530 which will be described below. The control unit 514 includes the transmission and reception unit 16, the in-vehicle control unit 18, and the image acquisition unit 20 as illustrated in FIG. 27.

Figure 28:
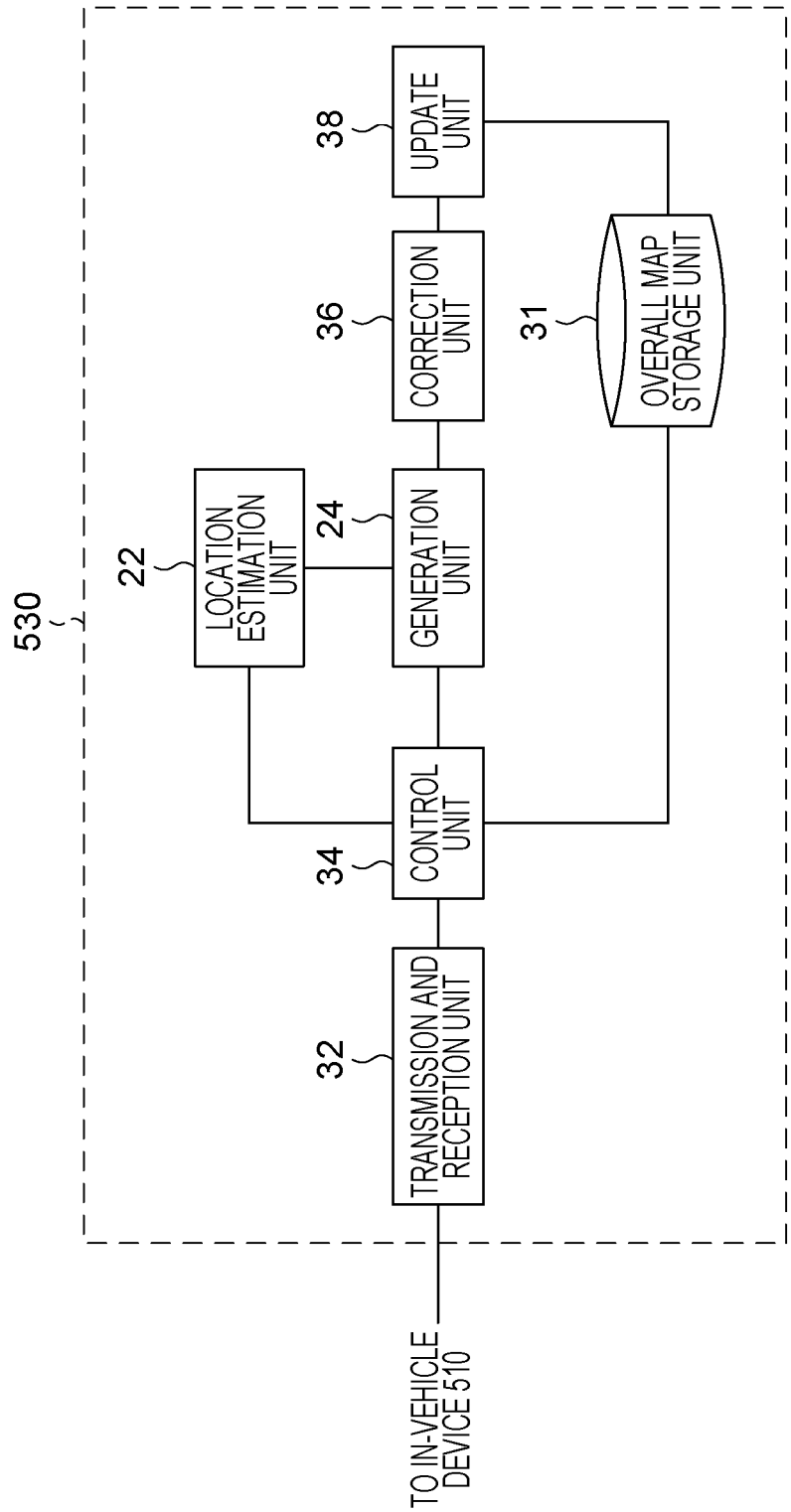
FIG. 28 is a schematic block diagram of a data management device according to the fifth embodiment.

The data management device 530 illustrated in FIG. 28 includes the overall map storage unit 31, the transmission and reception unit 32, the control unit 34, the correction unit 36, the update unit 38, the location estimation unit 22, and the generation unit 24. The data management device 530 generates a local map based on a peripheral image transmitted from the in-vehicle device 510 and updates an overall map stored in the overall map storage unit 31 based on the local map. The transmission and reception unit 32 is an example of a reception unit of the disclosed technology.

Since processing of each unit of the in-vehicle device 510 and the data management device 530 and the computer that realizes the in-vehicle device 510 and the data management device 530 are the same as in the first to fourth embodiments, description thereof is omitted.

In the above description, an aspect in which each program is previously stored (installed) in a storage unit is described, but the embodiment is not limited thereto. A program relating to the disclosed technology can also be provided in a form in which the program is recorded on a recording medium such as a CD-ROM, a DVD-ROM or a USB memory.

All documents, patent applications, and technical standards described in the present specification are incorporated in the present specification by reference in the same extent as a case where an individual document, patent application, and technical standard are specifically and individually described by reference.

Next, a modification example of the embodiment described above will be described.

In the above embodiment, a case where image information is used as an example of a method of re-identifying a location of a vehicle when a local map is corrected is described as an example, but the embodiment is not limited to this. For example, the location of the vehicle may be re-identified by measuring the location of the vehicle using a highly accurate GPS sensor. If the vehicle includes a sensor that accurately determines azimuth of the vehicle, a posture of the vehicle may be estimated based on the azimuth detected by the sensor. Image information and another sensor information may be combined with each other.

In the respective embodiments described above, a case where an in-vehicle device transmits a local map to a data management device when the vehicle stops is been described as an example, but the embodiments are not limited to this. For example, the in-vehicle device may transmit the local map to the data management device at a certain timing. Thereby, an overall map can be updated more frequently. For example, when the vehicle stops, if the vehicle is not in an environment capable of transmitting the local map (for example, when the vehicle is not in an environment in which information communication is performed, and the like) the in-vehicle device stores the local map in a predetermined memory region until a communication environment is established, and may transmit the local map if the communication environment is established.

In the respective embodiments described above, a case where one overall map is sequentially updated by a local map is described as an example, but the embodiments are not limited to this. For example, a plurality of overall maps representing a state of high occurrence frequency among states of target region may be prepared. In this case, for example, in a situation where the local map is not transmitted from the in-vehicle device, a plurality of overall maps which are previously prepared are used.

In the first to third embodiments, a case where an in-vehicle device generates a local map and a data management device updates an overall map based on the local map transmitted from the in-vehicle device is described as an example, but the embodiments are not limited to this. In the fourth embodiment, a case where the in-vehicle device generates the local map and updates the overall map is described as an example, and in the fifth embodiment, an example in which the data management device generates the local map and the overall map is updated is described, but the embodiment it is not limited to this. Arrangement of the respective units in the in-vehicle device and the data management device may be any arrangement as long as the data management system according to the present embodiment can be realized by the arrangement. For example, correction of the local map may be performed on the in-vehicle device side, the in-vehicle device may transmit the corrected local map to the data management device, and the data management device may update the overall map based on the corrected local map.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory, and
a processor coupled to the memory and configured to:

acquire an overall map from a storage which stores the overall map representing each of key frame images representing images which are captured by an image-capturing device mounted on a moving object according to locations of the moving object, each of the locations of the moving object at the time of capturing the key frame image, and a three-dimensional coordinate of each of feature points of the key frame image;

estimate a location of the moving object at the time of capturing each of peripheral images that are determined to correspond to any of the key frame images which are stored in the storage among the peripheral images, based on a time series of the peripheral images around the moving object which are captured during movement of the moving object by the image-capturing device that is mounted on the moving object;

calculate a three-dimensional coordinate of each of feature points of the peripheral image based on each of the estimated locations of the moving object and each of the peripheral images which are determined as the key frame image;

generate a local map representing each of the peripheral images which are determined as the key frame image, each of the estimated locations of the moving object, and the three-dimensional coordinate of each of the feature points of the peripheral image;

correct each of the locations of the moving object which is represented by the local map and a three-dimensional coordinate of each of the feature points of the peripheral image based on the location of the moving object which is reidentified from the key frame image of the generated local map, and update a portion corresponding to the local map of the acquired overall map based on the corrected local map.

2. The information processing device according to claim 1, the processor is further configured to:
identify each of the locations of the moving object which is represented by the local map according to the location of the moving object at the time of capturing each of the peripheral images which are determined as the key frame image of the local map;
calculate a reliability for the local map based on each of the identified locations of the moving object; and
update the overall map by using the local map according to the calculated reliability.

3. The information processing device according to claim 1, the processor is further configured to:
generate a shape model representing the three-dimensional coordinate of each of points on the moving object; and
update the overall map based on the location of the moving object which is obtained from the local map and the generated shape model.

4. A data management device comprising:
a memory, and
a processor coupled to the memory and configured to:
receive a time series of peripheral images around a moving object which are captured during movement of the moving object by an image-capturing device that is mounted on the moving object;
estimate a location of the moving object at the time of capturing each of peripheral images which are determined to correspond to any one of key frame images that are stored in a storage storing an overall map representing each of the key frame images representing images which are previously captured according to the locations of the moving object by the image-capturing device that is mounted on the moving object, each of the locations of the moving object at the time of capturing the key frame image, and a three-dimensional coordinate of each of feature points of the key frame image, among the peripheral images, based on the received time series of the peripheral images;

calculate a three-dimensional coordinate of each of feature points of the peripheral image based on each of the estimated locations of the moving object and each of the peripheral images which are determined as the key frame image;

generate a local map representing each of the peripheral images which are determined as the key frame image, each of the estimated locations of the moving object, and the three-dimensional coordinate of each of the feature points of the peripheral image;

correct each of the locations of the moving object which is represented by the local map and a three-dimensional coordinate of each of the feature points of the peripheral image based on the location of the moving object which is reidentified from the key frame image of the generated local map, and update a portion corresponding to the local map of the overall map stored by the storage based on the corrected local map.

5. A data management system comprising an information processing device and a data management device, wherein
the information processing device includes:
a first memory, and
a first processor coupled to the first memory and configured to:
acquire an overall map from a storage which stores the overall map representing each of key frame images representing images which are captured by an image-capturing device mounted on a moving object according to locations of the moving object, each of the locations of the moving object at the time of capturing the key frame image, and a three-dimensional coordinate of each of feature points of the key frame images,
estimate a location of the moving object at the time of capturing each of peripheral images that are determined to correspond to any of the key frame images which are stored in the storage among the peripheral images, based on a time series of peripheral images around the moving object which are captured during movement of the moving object by the image-capturing device that is mounted on the moving object,
calculate a three-dimensional coordinate of each of feature points of the peripheral image based on each of the estimated locations of the moving object and each of the peripheral images which are determined as the key frame image;
generate a local map representing each of the peripheral images which are determined as the key frame image, each of the estimated locations of the moving object, and the three-dimensional coordinate of each of the feature points of the peripheral image, and
transmit the generated local map to the data management device; and
the data management device includes:
a second memory,
the storage, and
a second processor coupled to the second memory and the storage, and configured to:
correct each of the locations of the moving object which is represented by the transmitted local map and a three-dimensional coordinate of each of the feature points of the peripheral image based on the location of the moving object which is reidentified from the key frame image of the transmitted local map, and update a portion, corresponding to the local map, of the overall map stored in the storage based on the corrected local map.

\* \* \* \* \*